US012059378B2

(12) United States Patent
 Buczkowski

(10) Patent No.: US 12,059,378 B2
(45) Date of Patent: Aug. 13, 2024

(54) ENCLOSED PATIENT SUITE WITH MOUNTED MEDICAL SYSTEMS

(71) Applicant: B/E Aerospace, Inc., Winston-Salem, NC (US)

(72) Inventor: Pawel Buczkowski, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 912 days.

(21) Appl. No.: 17/121,655

(22) Filed: Dec. 14, 2020

(65) Prior Publication Data
 US 2022/0183909 A1 Jun. 16, 2022

(51) Int. Cl.
 *A61G 10/02* (2006.01)
 *A61G 12/00* (2006.01)
 *B64D 11/00* (2006.01)

(52) U.S. Cl.
 CPC ........... *A61G 10/02* (2013.01); *A61G 12/007* (2013.01); *A61G 2203/20* (2013.01); *A61G 2210/70* (2013.01); *A61G 2220/10* (2013.01); *B64D 2011/0069* (2013.01)

(58) Field of Classification Search
 CPC .............. A01G 12/007; A01G 2220/10; B64D 2011/0092
 See application file for complete search history.

(56) References Cited

U.S. PATENT DOCUMENTS

| 2,456,024 | A | * | 12/1948 | Schofield | A61G 3/0272 5/164.1 |
| 4,115,884 | A | * | 9/1978 | Keogh | B64D 11/00 296/19 |
| 4,352,991 | A | | 10/1982 | Kaufman | |
| 4,425,978 | A | * | 1/1984 | Star | B62D 47/02 180/41 |
| 4,458,864 | A | | 7/1984 | Colombo et al. | |

(Continued)

FOREIGN PATENT DOCUMENTS

| AU | 2000036414 A1 | 10/2000 |
| DE | 102007009544 B4 | 11/2014 |

(Continued)

OTHER PUBLICATIONS

Extended Search Report in European Application No. 21214474.5 dated Apr. 26, 2022, 7 pages.

*Primary Examiner* — Christopher P Ellis
(74) *Attorney, Agent, or Firm* — Suiter Swantz IP

(57) ABSTRACT

An enclosed patient suite may include a plurality of suite walls, a patient bed positioned in a patient area defined within the plurality of suite walls, a plurality of medical systems with at least some of the plurality of medical systems mounted to the plurality of suite walls, a plurality of support members coupled to the plurality of suite walls, a plurality of wheels with a particular wheel of the plurality of wheels coupled to a corresponding support member of the plurality of support members, a rail brake configured to engage a floor-mounted rail in a floor of at least one of a cargo hold or a cabin of an aircraft, and a controller coupled to the plurality of medical systems and configured to receive data from and transmit data to the plurality of medical systems. The enclosed patient suite may be dimensioned to fit within the aircraft.

15 Claims, 21 Drawing Sheets

(56) References Cited

U.S. PATENT DOCUMENTS

| | | | |
|---|---|---|---|
| 4,957,121 A * | 9/1990 | Icenogle | A61G 3/00 |
| | | | D12/132 |
| 5,702,142 A * | 12/1997 | Newell | A61G 3/00 |
| | | | 296/19 |
| 5,755,479 A * | 5/1998 | Lavin | A61G 7/05 |
| | | | 5/503.1 |
| 5,779,296 A * | 7/1998 | Hewko | A61G 3/0866 |
| | | | 244/118.6 |
| 5,964,065 A | 10/1999 | Migurski et al. | |
| 6,001,057 A | 12/1999 | Bongiovanni et al. | |
| 6,175,977 B1 | 1/2001 | Schumacher et al. | |
| 6,230,710 B1 | 5/2001 | Sobko et al. | |
| 6,488,029 B1 * | 12/2002 | Hood | A61G 1/04 |
| | | | 128/845 |
| 6,546,577 B1 * | 4/2003 | Chinn | A61G 1/0268 |
| | | | 5/503.1 |
| 6,899,103 B1 | 5/2005 | Hood et al. | |
| 6,923,606 B2 * | 8/2005 | Fehrle | A61G 3/0825 |
| | | | 244/118.6 |
| 7,028,351 B1 | 4/2006 | Frieder et al. | |
| 8,489,419 B2 | 7/2013 | Sacco et al. | |
| 8,505,959 B2 | 8/2013 | Darling, III | |
| 8,662,447 B2 | 3/2014 | Johnson et al. | |
| 9,022,263 B1 | 5/2015 | Russell | |
| 9,796,473 B2 | 10/2017 | Saint-Jalmes et al. | |
| 9,802,655 B2 * | 10/2017 | Sharbono | A61G 3/00 |
| 2003/0057323 A1 * | 3/2003 | Keogh | B64D 11/0604 |
| | | | 244/118.5 |
| 2008/0250559 A1 | 10/2008 | Janboecke et al. | |
| 2013/0328361 A1 | 12/2013 | Egan | |
| 2015/0225973 A1 | 8/2015 | Patoine et al. | |
| 2017/0130447 A1 | 5/2017 | Lane, Jr. et al. | |

FOREIGN PATENT DOCUMENTS

| | | | | |
|---|---|---|---|---|
| DE | 102014115747 A1 | 5/2016 | | |
| EP | 0680433 B1 | 6/2000 | | |
| EP | 1920745 A2 * | 5/2008 | | A61G 1/06 |
| FR | 2426608 A1 | 12/1979 | | |
| FR | 2424736 B1 | 9/1984 | | |
| GB | 647040 A * | 7/2011 | | |
| WO | WO-9616867 A1 * | 6/1996 | | A61G 3/06 |
| WO | WO-02074218 A1 * | 9/2002 | | A61G 1/06 |
| WO | WO-2008138138 A1 * | 11/2008 | | A61G 5/10 |
| WO | 2015059512 A1 | 4/2015 | | |
| WO | 2017145177 A1 | 8/2017 | | |
| WO | 2020142310 A1 | 7/2020 | | |

* cited by examiner

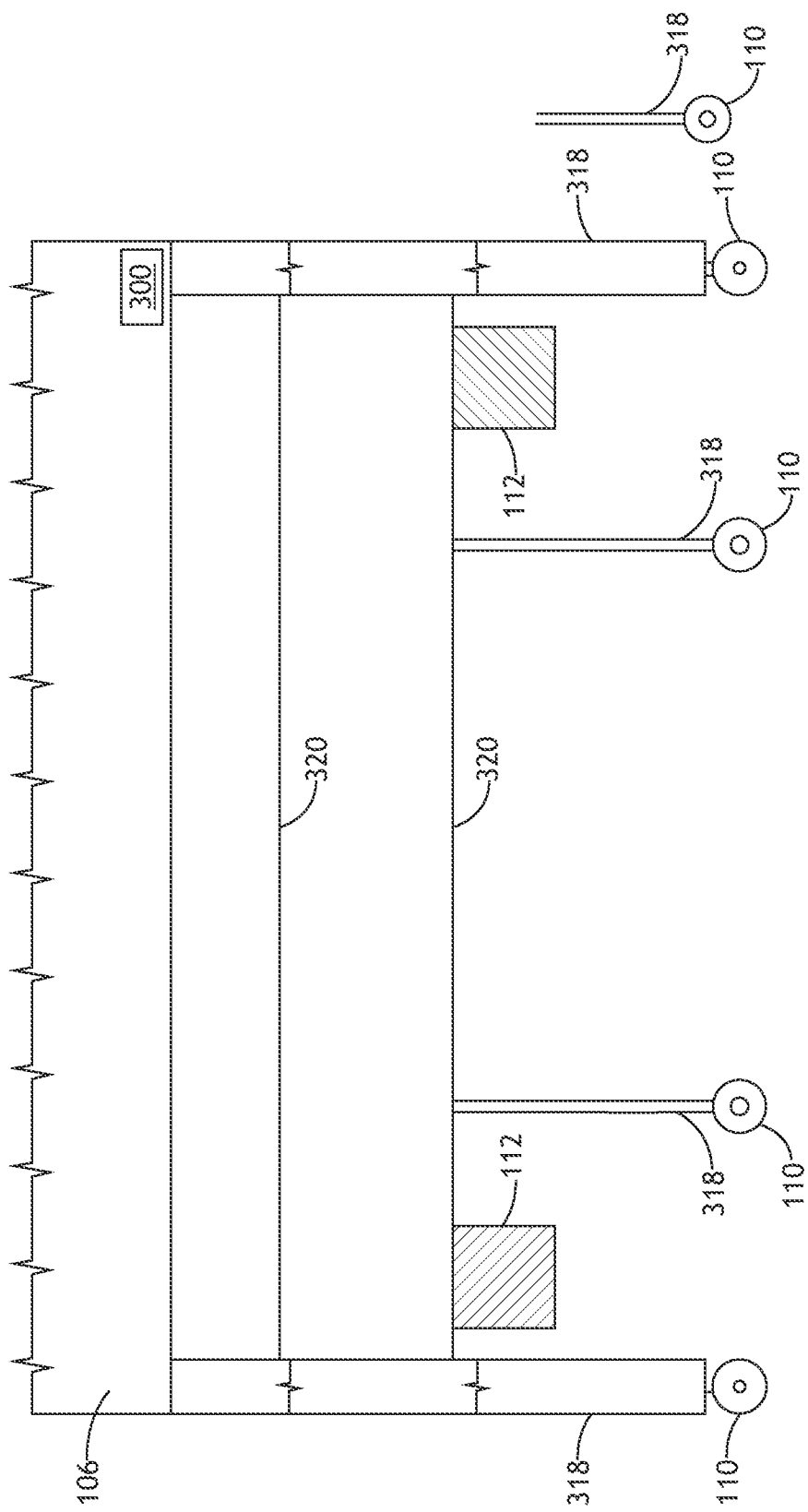

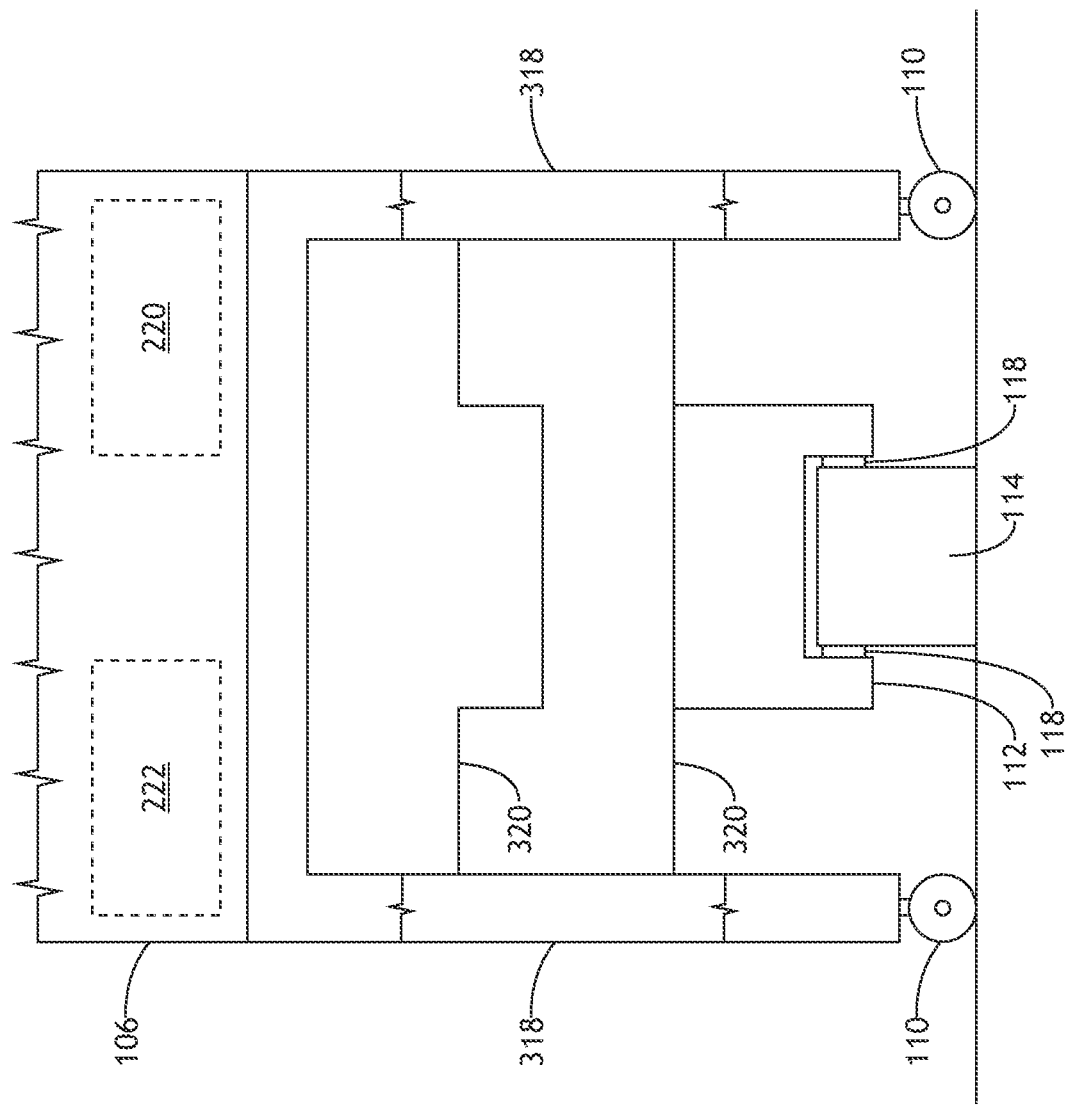

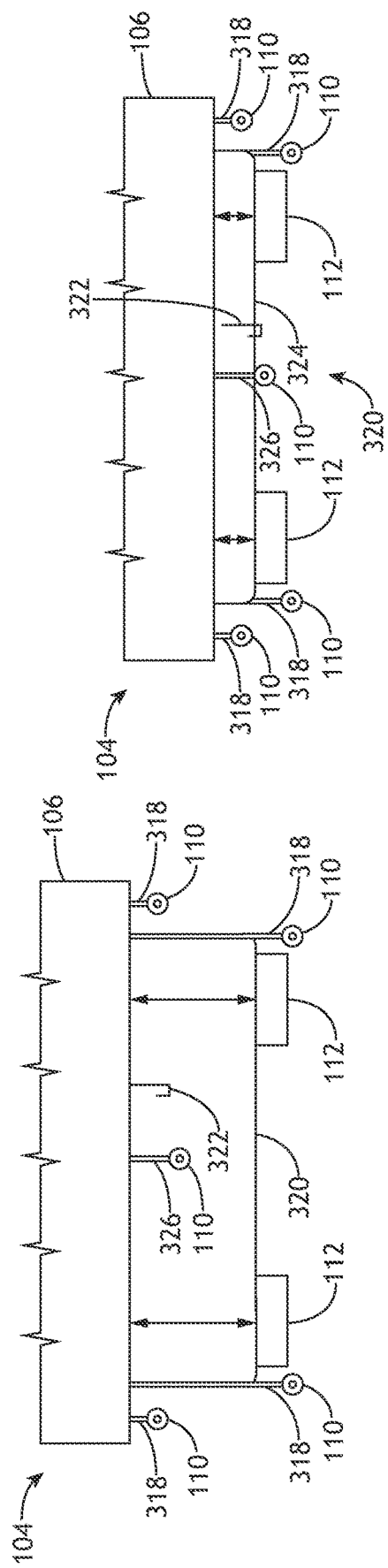

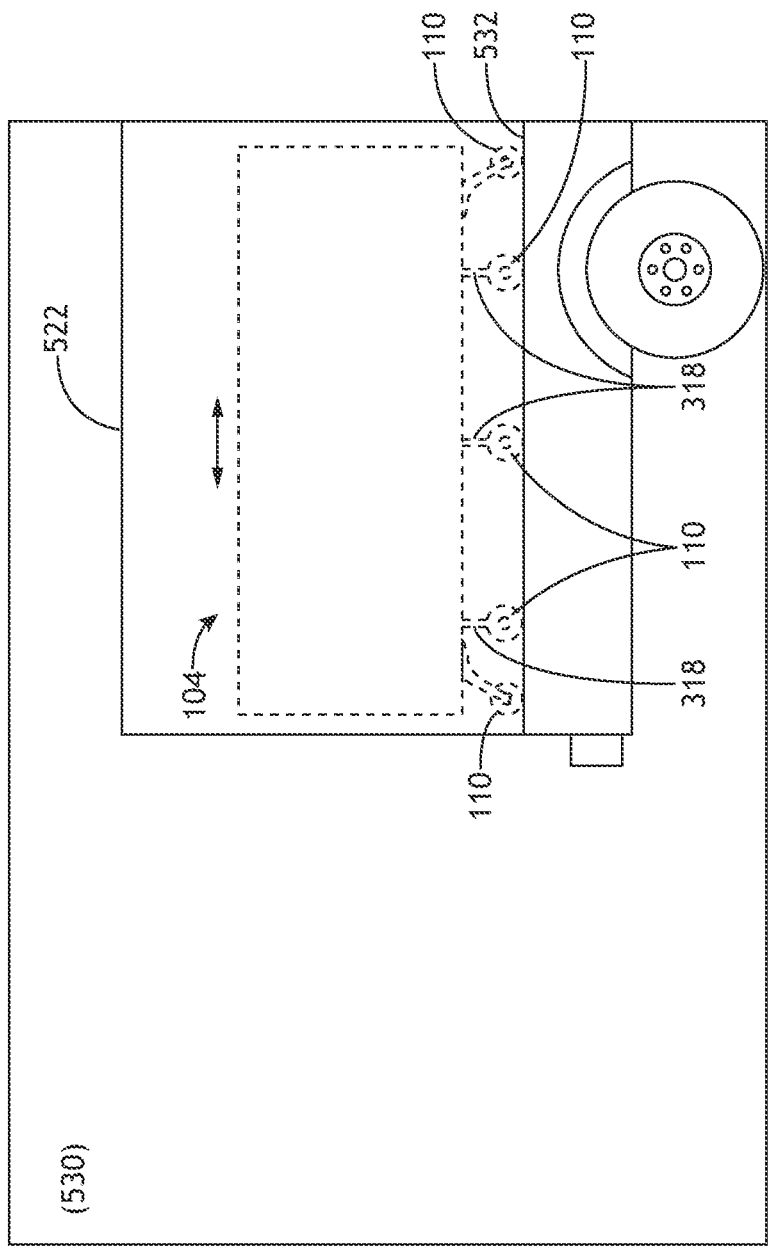

ENCLOSED PATIENT SUITE WITH MOUNTED MEDICAL SYSTEMS

BACKGROUND

Current medical gurneys are limited in features, providing only minimal support for a patient during transfer between medical locations. During the changing of locations, the patient may need to be connected to and/or disconnected from patient monitoring systems at each medical location. The medical gurneys may be non-standardized with respect to the various types of medical locations and may be difficult to relocate during transfer between medical locations and/or difficult to secure at the medical locations between transfers.

SUMMARY

An enclosed patient suite is disclosed, in accordance with one or more embodiments of the disclosure. The enclosed patient suite may include a patient bed. The enclosed patient suite may include a plurality of suite walls. The patient bed may be positioned in a patient area defined within the plurality of suite walls. The enclosed patient suite may include a plurality of medical systems. At least some of the plurality of medical systems may be mounted to the plurality of suite walls. The enclosed patient suite may include a plurality of support members. The plurality of support members may be coupled to the plurality of suite walls. The enclosed patient suite may include a plurality of wheels. A particular wheel of the plurality of wheels may be coupled to a corresponding support member of the plurality of support members. The enclosed patient suite may include a rail brake. The rail brake may be configured to engage a floor-mounted rail in a floor of at least one of a cargo hold or a cabin of an aircraft. The enclosed patient suite may be dimensioned to fit within the aircraft. The enclosed patient suite may include a controller. The controller may be coupled to the plurality of medical systems. The controller may be configured to receive data from and transmit data to the plurality of medical systems.

In some embodiments, an upper portion of the patient bed may be actuatable between a bed position and at least one raised position.

In some embodiments, at least some of the plurality of wheels may be coupled to the plurality of suite walls.

In some embodiments, at least some of the plurality of support members may be actuatable between a raised position and a lowered position.

In some embodiments, at least some of the plurality of medical systems may be mounted in the patient area in a space underneath the patient bed.

In some embodiments, the plurality of medical systems may include at least one of a refrigeration unit, a sterilizer, a patient monitoring system, a locking tool rack, a plurality of mount locations for medical supplies, or one or more identification tags.

In some embodiments, the enclosed patient suite may include a door. The door may be configured to actuate between an open position and a closed position. The door may be configured to provide access to the patient area through an opening in the plurality of suite walls.

In some embodiments, the closed position of the door may be located in a cavity defined within the plurality of suite walls.

In some embodiments, the enclosed patient suite may be configured to couple to the aircraft for at least one of power transfer or data transfer.

In some embodiments, the enclosed patient suite may include a battery. The enclosed patient suite may include an uninterruptable power supply (UPS). The enclosed patient suite may include a power switching system coupled to at least one of the battery, the UPS, or the aircraft.

In some embodiments, the power switching system may be configured to allow the aircraft to charge at least one of the battery or the UPS when the enclosed patient suite is coupled to the aircraft.

In some embodiments, the power switching system may be configured to allow the aircraft to power at least some of the plurality of medical systems when the enclosed patient suite is coupled to the aircraft.

In some embodiments, the power switching system may be configured to switch the battery or the UPS to powering at least some of the plurality of medical systems when the enclosed patient suite is uncoupled from the aircraft.

An enclosed patient suite is disclosed, in accordance with one or more embodiments of the disclosure. The enclosed patient suite may include a patient bed. The enclosed patient suite may include a plurality of suite walls. The patient bed may be positioned in a patient area defined within the plurality of suite walls. The enclosed patient suite may include a plurality of medical systems. At least some of the plurality of medical systems may be mounted to the plurality of suite walls. The enclosed patient suite may include a plurality of support members. The plurality of support members may be coupled to the plurality of suite walls. The enclosed patient suite may include a plurality of wheels. A particular wheel of the plurality of wheels may be coupled to a corresponding support member of the plurality of support members. The enclosed patient suite may include a rail brake. The rail brake may be configured to engage a floor-mounted rail in a floor of at least one of a cargo hold or a cabin of an aircraft. The enclosed patient suite may be dimensioned to fit within the aircraft, a vehicle, and a building. The enclosed patient suite may be transferrable between the aircraft and the vehicle at a first time. The enclosed patient suite may be transferrable between the aircraft and the building at a second time. The enclosed patient suite may include a controller. The controller may be coupled to the plurality of medical systems. The controller may be configured to receive data from and transmit data to the plurality of medical systems.

In some embodiments, the enclosed patient suite may be configured to couple to the aircraft at a third time for at least one of power transfer or data transfer. The enclosed patient suite may be configured to the vehicle at a fourth time for at least one of power transfer or data transfer. The enclosed patient suite may be configured to the building at a fifth time for at least one of power transfer or data transfer.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure

FIG. 3D illustrates an elevation view of an enclosed patient suite with mounted medical systems, in accordance with one or more embodiments of the disclosure;

FIG. 3E illustrates an elevation view of an enclosed patient suite with mounted medical systems, in accordance with one or more embodiments of the disclosure;

FIG. 3F illustrates an elevation view of an enclosed patient suite with mounted medical systems, in accordance with one or more embodiments of the disclosure;

FIG. 3G illustrates an elevation view of an enclosed patient suite with mounted medical systems, in accordance with one or more embodiments of the disclosure;

FIG. 7E illustrates an enclosed patient suite and a vehicle, in accordance with one or more embodiments of the disclosure;

DETAILED DESCRIPTION OF THE INVENTION

Figure 1A:
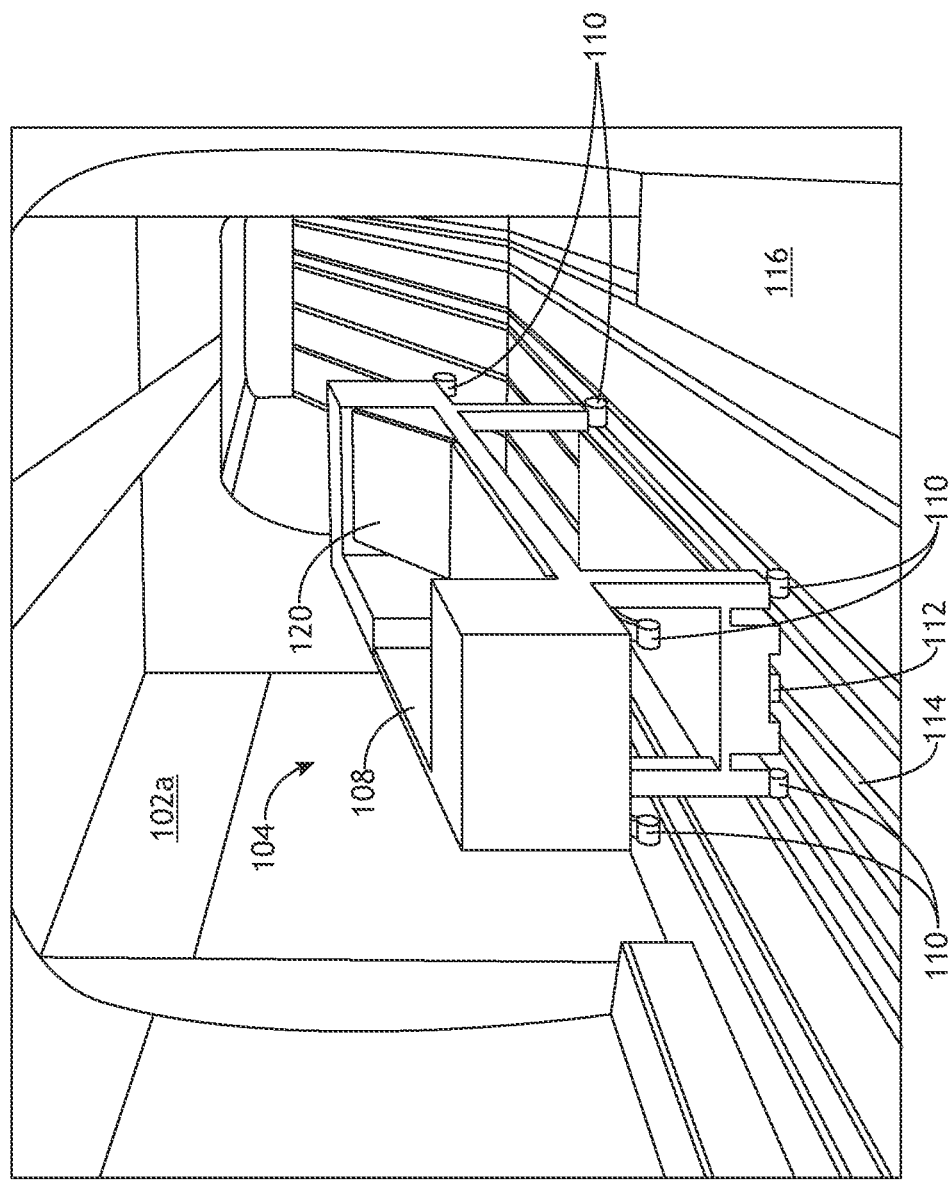
FIG. 1A illustrates an aircraft cargo hold including an enclosed patient suite with mounted medical systems, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one," "one or more," or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

FIGS. 1A-10 in general illustrate an enclosed patient suite with mounted medical systems, in accordance with one or more embodiments of the disclosure.

Current medical gurneys are limited in features, providing only minimal support for a patient during transfer between medical locations. For example, a patient may need to be transferred between field locations (e.g., areas of conflict, bases, or the like) and hospitals. The patient may need to be transferred from the field location via an aircraft. The patient may need to be transferred to and/or from the aircraft via a vehicle (e.g., a truck, an ambulance, or the like).

During the changing of locations, the patient may need to be connected to and/or disconnected from patient monitoring systems at the medical location. For example, the aircraft, the vehicle, and/or the hospital may include medical tools and/or medical devices for stabilizing, analyzing, treating, and/or monitoring the patient during transportation on the medical gurney. The aircraft, the vehicle, and/or the hospital may include connections for couplers (e.g., physical couplers, electrical couplers, fluidic couplers, communicative couplers, or the like) configured to attach to the medical tools and/or medical devices for stabilizing, analyzing, treating, and/or monitoring the patient which may accompany the medical gurney.

The medical gurneys may be non-standardized with respect to the various types of medical locations and may be difficult to relocate during transfer between medical locations and/or difficult to secure at the medical locations between transfers. For example, where the medical gurney is transferred from the field location via an aircraft, the medical gurney may need to be insertable and/or removable from the aircraft, and may need to be secured within the aircraft during flight. By way of another example, where the medical gurney is transferred via a vehicle, the medical gurney may need to be insertable and/or removable from the vehicle, and may need to be secured within the vehicle during travel. By way of another example, the medical gurney may need to be moveable between the vehicle and the aircraft.

As such, it would be beneficial to provide an enclosed patient suite with mounted medical systems. The enclosed patient suite may be insertable, removable, moveable, and/or transportable in an aircraft, a vehicle, and/or a building. The enclosed patient suite may include a patient bed. The enclosed patient suite may include mounted medical tools and/or medical devices for stabilizing, analyzing, treating, and/or monitoring the patient, which accompany the patient bed within the enclosed patient suite. The enclosed patient suite may include connections for couplers (e.g., physical couplers, electrical couplers, fluidic couplers, communicative couplers, or the like) configured to attach to the aircraft, the vehicle, and/or the building with the medical tools and/or medical devices for stabilizing, analyzing, treating, and/or monitoring the patient accompanying the patient bed within the enclosed patient suite. The patient bed may be enclosed for privacy and/or for safety (e.g., safety in instances where exposure to an outside environment may threaten the patient and/or medical personnel treating the patient).

It is noted herein the enclosed patient suite and/or mounted medical systems of the enclosed patient suite may be configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like. For instance, both the enclosed patient suite and/or mounted medical systems of the enclosed patient suite may be tested per aviation guidelines and/or standards in the most recent versions of the codes set forth in at least 14 C.F.R. Part 25, AIRWORTHINESS STANDARDS: TRANSPORT CATEGORY AIRPLANES in effect at the time of filing.

Figure 1B:
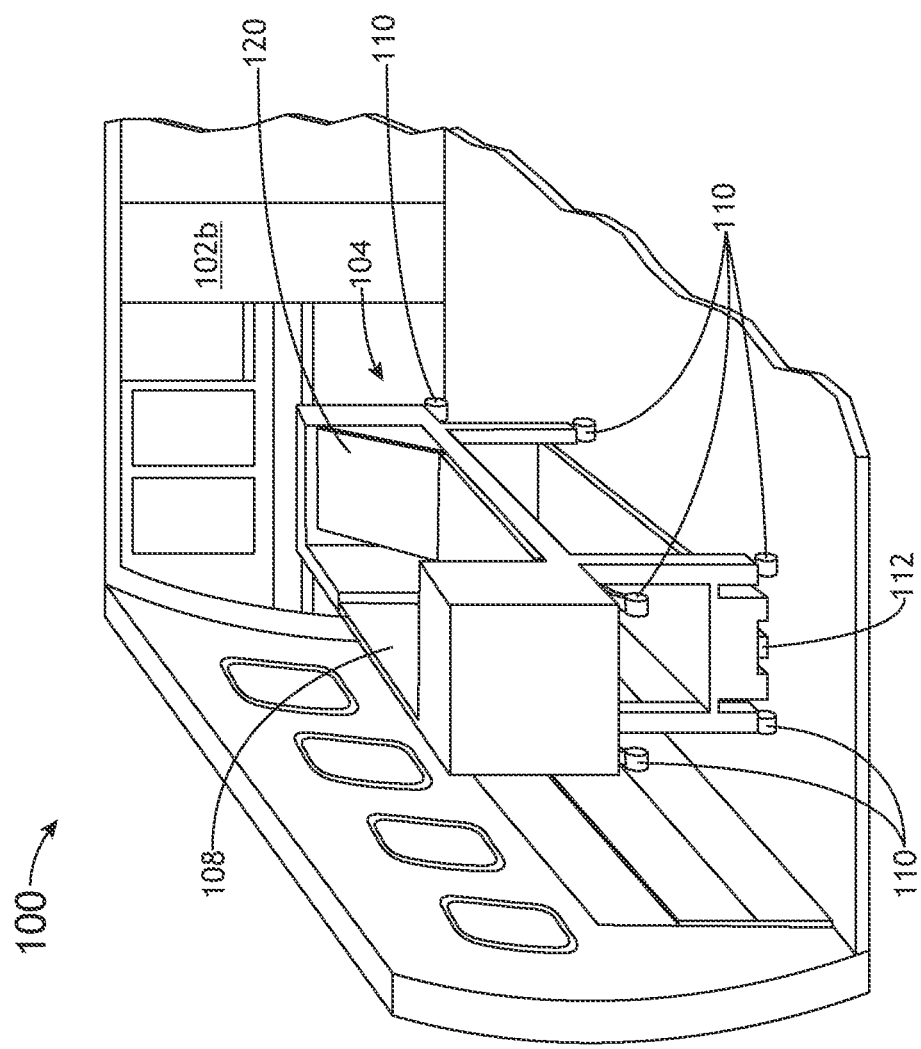
FIG. 1B illustrates an aircraft cabin including an enclosed patient suite with mounted medical systems, in accordance with one or more embodiments of the disclosure.

FIGS. 1A and 1B in general illustrate an aircraft 100, in accordance with one or more embodiments of the disclosure. The aircraft 100 may include a cargo hold 102a or cabin 102b. The cargo hold 102a or the cabin 102b may include an enclosed patient suite 104. It is noted herein "enclosed patient suite" and variants of the term including, but not limited to, "patient suite," "enclosed medical suite," "medical suite," "suite," or the like may be considered equivalent, for purposes of the disclosure.

The suite 104 may include one or more suite walls 106 coupled to a suite floor, and one or more doors 108. It is noted herein the coupling or at least partially installing (e.g., insetting, embedding, or the like) medical tools and/or medical devices in the one or more walls 106 may be considered mounting the medical tools and/or medical devices within the suite 104, for purposes of the disclosure.

Where the suite 104 is rectangular, the one or more suite walls 106 may form at least three sides of the suite 104. For example, the one or more suite walls 106 may include three suite walls 106 which form three sides of the suite 104 and one or more doors 108 which form a fourth side of the suite 104. By way of another example, the one or more suite walls 106 may include four suite walls 106, where three suite walls 106 form three sides of the suite 104 and a fourth suite wall 106 partially forms a fourth side of the suite 104, with one or more doors 108 forming the remainder of the fourth side. In it noted herein "walls," "panels," "partitions," "shells," and "screens" may be configured equivalent, for purposes of the disclosure.

The one or more doors 108 may be configured to allow access into the suite 104. For example, a door 108 may rest on a corresponding track (or set of tracks), and may actuate along the track (e.g., in a sliding motion) between a closed position and an open position. For instance, the door 108 may slide within a cavity (e.g., cavity 206, as illustrated in at least FIG. 2) defined within a suite wall 106 (e.g., is a pocket door), against an exterior surface of a suite wall 106, or an interior surface of a suite wall 106. By way of another example, a door 108 may be coupled to a suite wall 106 via one or more hinge assemblies. By way of another example, a door 108 may be coupled to a suite wall 106 via one or more interlocking assemblies (e.g., tab and groove assemblies, latch assemblies, snap-fit or interference assemblies, or the like), where the one or more interlocking assemblies may be disassembled to allow for access into the suite 104. By way of another example, a door 108 may be configured to draw, roll up, or otherwise collapse when actuating from a closed position to an open position, and vice versa when actuating from the open position to the closed position.

It is noted herein the suite 104 may not include the one or more doors 108, and that the one or more suite walls 106 may instead leave a gap or opening to allow for access into the suite 104.

The suite 104 may include a set of wheels 110. For example, the set of wheels 110 may include one or more caster wheels and/or one or more fixed wheels. By way of another example, the set of wheels 110 may include, but are not limited to, solid plastic wheels, hard foam wheels, solid rubber wheels, solid tubeless pneumatic wheels, tubed pneumatic wheels, or the like.

The suite 104 may include one or more floor couplers 112 configured to couple to a floor-mounted component 114 within a floor 116 of the cargo hold 102a and/or the cabin 102*b* of the aircraft 100. For example, the one or more floor couplers 112 may include, but are not limited to, a rail brake 112. By way of another example, the one or more floor-mounted components 114 may include, but are not limited to, a rail 114. It is noted herein the one or more floor-mounted components 114 may include tracks, brackets, or other floor-mounted components 114.

The one or more floor couplers 112 may include one or more brake pads 118 configured to engage a surface of the floor-mounted component 114, where the one or more brake pads 118 are manually engaged or disengaged, and/or are engaged or disengaged with one or more mechanical, electromechanical, pneumatic, or hydraulic actuation devices (e.g., assemblies, controls, actuators such as motors, or the like). By way of another example, the one or more floor couplers 112 may include feet configured to be inserted within a hole in the floor-mounted component 114.

The one or more floor couplers 112 may be positioned between wheels of the set of wheels 110 or outside of wheels of the set of wheels 110.

The suite 104 may include a patient bed 120. It is noted herein "patient bed" and variants of the term including, but not limited to, "bed," or the like may be considered equivalent, for purposes of the disclosure.

FIGS. 2-4B in general illustrate example embodiments of the suite 104, in accordance with one or more embodiments of the disclosure. The suite 104 may include a number of medical tools and/or medical devices for stabilizing, analyzing, treating, and/or monitoring the patient. It is noted herein the medical tools and/or medical devices as described with respect to at least FIGS. 2-4B may be considered medical systems of the suite 104. The suite 104 may include a number of auxiliary components for securing the medical tools and/or medical devices, medical supplies, personal effects of the patient and/or the medical personnel. For example, the auxiliary components may include, but are not limited to, storage compartments, trays, shelves, tool racks, or the like.

Figure 2:
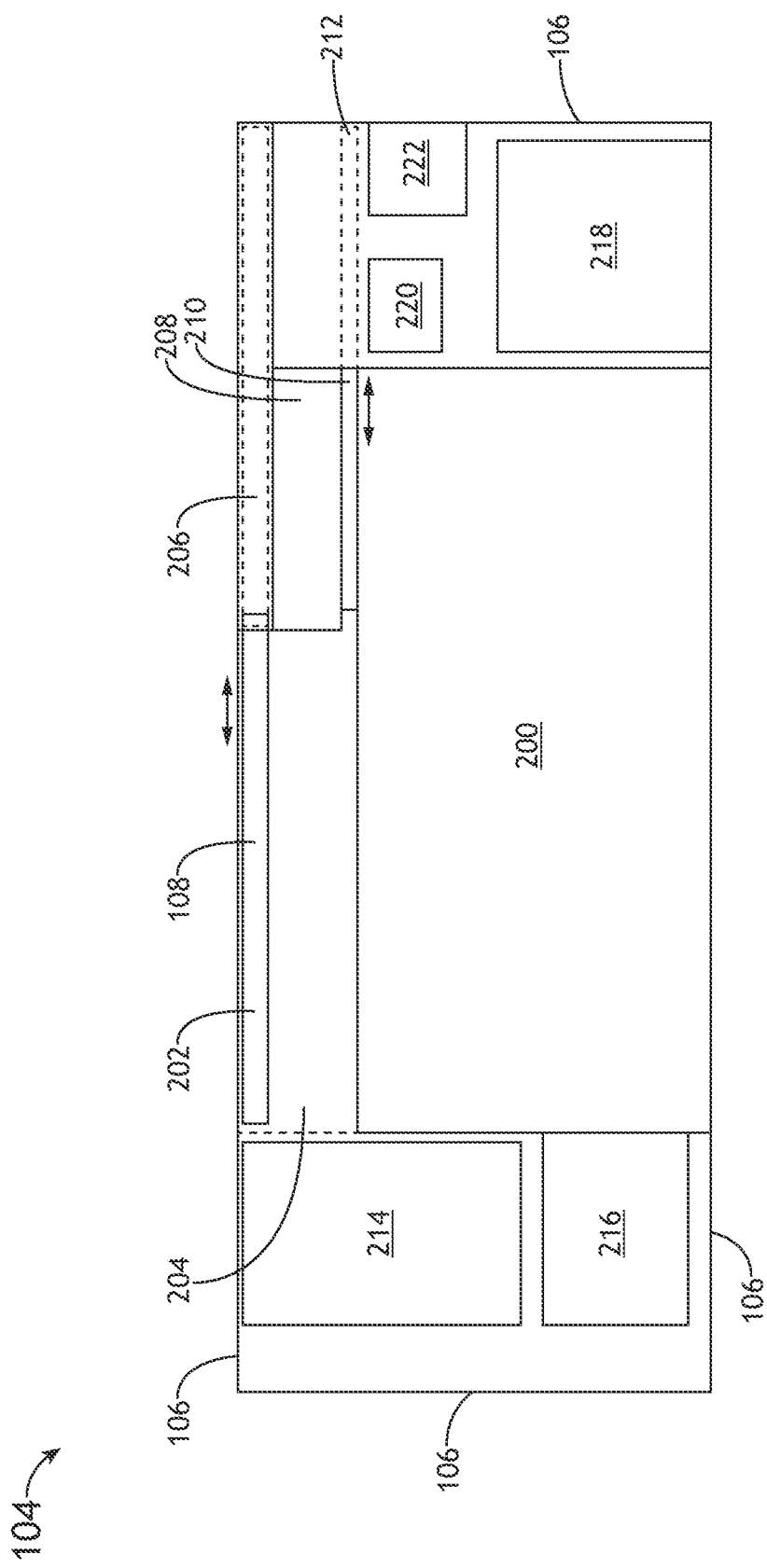
FIG. 2 illustrates a top plan view of an enclosed patient suite with mounted medical systems, in accordance with one or more embodiments of the disclosure.

Referring now to FIG. 2, a top plan view of an example embodiment of the suite 104 is illustrated, in accordance with one or more embodiments of the disclosure.

The suite 104 may include a patient area 200. For example, the patient area 200 may include an area in which the patient bed 120 is located proximate to the one or more doors 108. The patient area 200 may be accessed via an opening 202 within the one or more suite walls 106, where the opening 202 is created by the one or more doors 108 actuating into an open position (e.g., within the cavity 206). It is noted herein the opening 202 may lead directly into the patient area 200, or may lead to a pass-through area 204 before entering the patient area 202. For example, the pass-through area 204 may be empty space between the surrounding environment and the patient area 200. By way of another example, the pass-through area 204 may be of a length, width, and/or depth necessary to accommodate space needed for medical tools, medical devices, and/or auxiliary components either coupled to or at least partially installed in (e.g., inset, embedded, or the like) the one or more suite walls 106 or underneath the patient bed 120.

The suite 104 may include one or more storage compartments 208. The one or more storage compartments 208 may be either coupled to or at least partially installed in (e.g., inset, embedded, or the like) the one or more suite walls 106 or underneath the patient bed 120.

The one or more storage compartment 208 may be configured to receive and hold medical supplies, medical devices, medical tools, or the like. The one or more storage compartments 208 may include one or more safety devices (e.g., air masks, personal floatation devices, or the like).

The one or more storage compartments 208 may include a storage compartment (e.g., a wardrobe) configured to receive long and/or large items (e.g., passenger amenities needing to be hung, carry-on luggage, or the like) that require an increased space and/or that a passenger may prefer to store in a substantially vertical or upright orientation.

The one or more storage compartments 208 may be configured to receive and hold (e.g., contain, secure, or the like) one or more passenger amenities including, but not limited to, paper-printed materials (e.g., magazines, newspapers, pamphlets, or the like), select personal electronic devices (e.g., phones, tablets, phablets, laptops, music devices, digital video disc (DVD) players, handheld gaming consoles or devices, or the like), food products, drink products, or the like.

The one or more storage compartments 208 may include one or more electronic connections for one or more passenger amenities such as, but not limited to, one or more charging ports, one or more charging cables, or the like.

The one or more storage compartments 208 may include one or more electronic connections in communication with one or more components of the suite 104 such as, but not limited to, one or more display device connection ports, one or more display device connection cables, one or more audio output jacks (e.g., headphone jacks), one or more audio input jacks, or the like.

The one or more storage compartments 208 may include one or more doors 210. For example, a door 210 may rest on a corresponding track (or set of tracks), and may actuate along the track (e.g., in a sliding motion) between a closed position and an open position. For instance, the door 210 may slide within a cavity 212 defined within the suite wall 106 (e.g., is a pocket door), against an exterior surface of a suite wall 106, or an interior surface of a suite wall 106. By way of another example, a door 210 may be coupled to a suite wall 106 via one or more hinge assemblies. By way of another example, a door 210 may be coupled to a suite wall 106 via one or more interlocking assemblies (e.g., tab and groove assemblies, latch assemblies, snap-fit or interference assemblies, or the like), where the one or more interlocking assemblies may be disassembled to allow for access into a corresponding storage compartment 208. By way of another example, a door 210 may be configured to draw, roll up, or otherwise collapse when actuating from a closed position to an open position, and vice versa when actuating from the open position to the closed position. The one or more storage compartments 208 may be accessible from within the suite 104 (e.g., where the one or more doors 210 are directed inward into the patient area 200) or from outside the suite 104 (e.g., where the one or more doors 210 are directed outward into the cargo hold 102*a* and/or the cabin 102*b*).

The suite 104 may include one or more refrigerators or refrigeration units 214. For example, the one or more refrigeration units 214 may be configured to store medical supplies (e.g., medicine) needing to be kept in a particular (e.g., cold) environment. The one or more refrigeration units 214 may include one or more components (e.g., doors, lids, or the like) configured to allow access into the one or more refrigeration units 214. The one or more refrigeration units 214 may be accessible from within the suite 104 (e.g., where the one or more components configured to allow access are directed inward into the patient area 200) or from outside the suite 104 (e.g., where the one or more components configured to allow access are directed outward into the cargo hold 102a and/or the cabin 102b).

The suite 104 may include one or more sterilizers 216. For example, the one or more sterilizers 216 may be configured to store medical supplies (e.g., medicine), medical tools, and/or medical devices needing to be kept in a sterilized environment. By way of another example, the one or more sterilizers 216 may be configured to sterilize the medical tools and/or medical devices placed within the one or more sterilizers 216. For instance, the one or more sterilizers 216 may include, but are not limited to, an autoclave, a glass bead sterilizer, or the like. The one or more sterilizers 216 may include one or more components (e.g., doors, lids, or the like) configured to allow access into the one or more sterilizers 216. The one or more sterilizers 216 may be accessible from within the suite 104 (e.g., where the one or more components configured to allow access are directed inward into the patient area 200) or from outside the suite 104 (e.g., where the one or more components configured to allow access are directed outward into the cargo hold 102a and/or the cabin 102b).

The suite 104 may include one or more patient monitoring systems 218. For example, the one or more patient monitoring systems 218 may include a controller, with components as described throughout the disclosure. By way of another example, the one or more patient monitoring systems 218 may include a user interface, with components as described throughout the disclosure.

The suite 104 may include a battery 220. For example, the battery 220 may be configured to maintain power for medical tools and/or medical devices installed within the suite 104 during transfer between locations (e.g., the field, a vehicle, an aircraft, a hospital, or the like), during power outages, or during general operation. The suite 104 may include an uninterruptible power supply (UPS) 222. For example, the UPS 222 may be configured to provide backup to the battery 220. By way of another example, the UPS 222 may be configured to charge the battery 220. The UPS 222 may be couplable to the aircraft 100. In this regard, the suite 104 may not need to be coupled to a surrounding power system (e.g., within the aircraft 100, within a vehicle, within a hospital, or the like), allowing for complete mobility of the suite 104. It is noted herein, however, the suite 104 may include connections for couplers (e.g., physical couplers, electrical couplers, fluidic couplers, communicative couplers, or the like) configured to attach to a surrounding power system for purposes of obtaining power and/or data.

Referring now to FIGS. 3A-3G, elevation views of example embodiments of the suite 104 are illustrated, in accordance with one or more embodiments of the disclosure.

The suite 104 may include one or more identification (ID) tags 300. For example, the one or more identification (ID) tags 300 may include, but are not limited to, radio frequency identification tags (RFID tags). By way of another example, the one or more ID tags 300 may include Quick Response (QR) codes, handwritten or printed tags, or the like. It is noted herein the one or more ID tags 300 may be tangible objects or may be graphically displayed on a user interface. The one or more ID tags 300 may be coupled to an exterior surface (e.g., within an environment of the cargo hold 102a and/or cabin 102b) or an interior surface of the one or more suite walls 106.

Figure 3A:
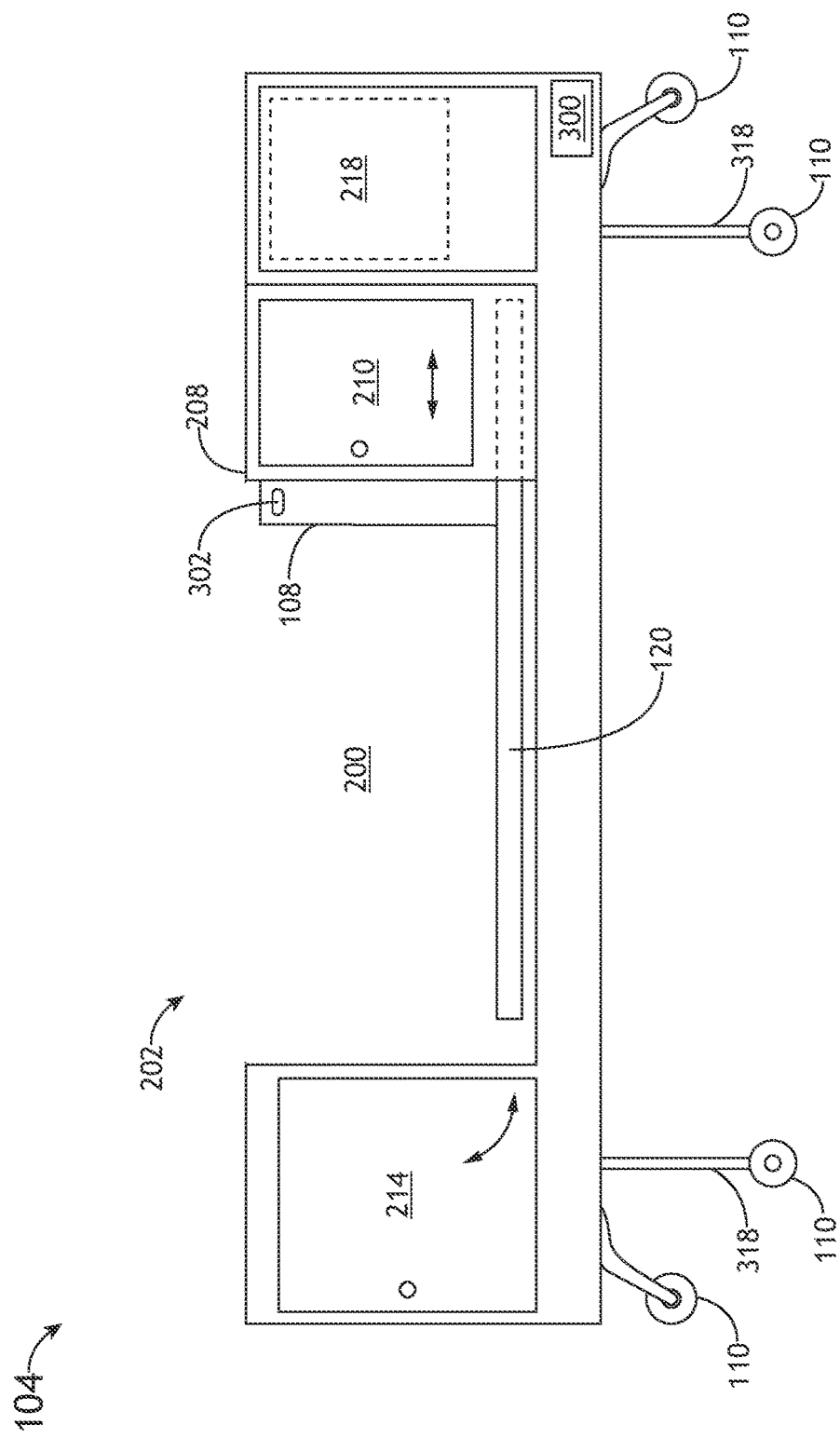
FIG. 3A illustrates an elevation view of an enclosed patient suite with mounted medical systems, in accordance with one or more embodiments of the disclosure.
Figure 3B:
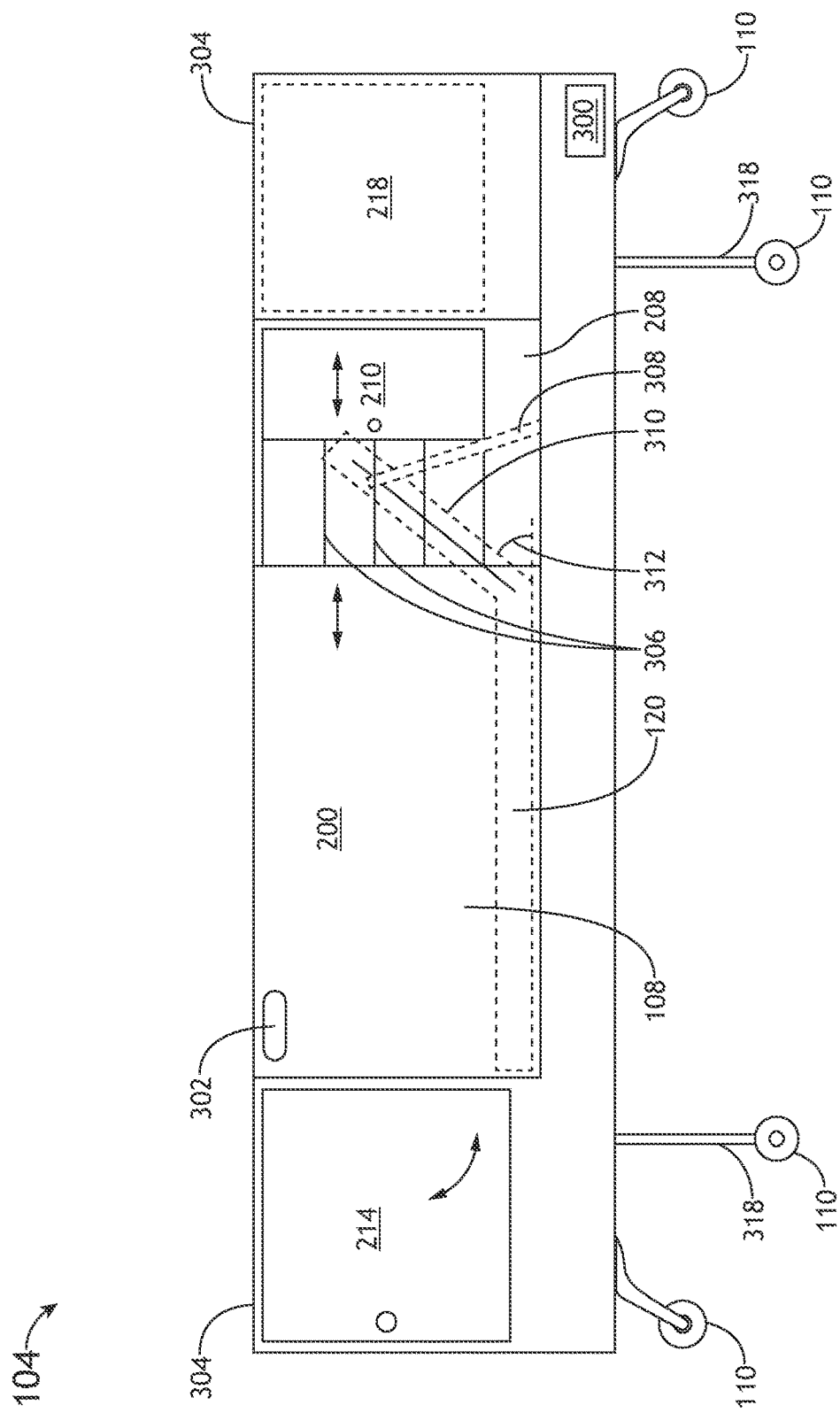
FIG. 3B illustrates an elevation view of an enclosed patient suite with mounted medical systems, in accordance with one or more embodiments of the disclosure.

It is noted herein the door 108 is illustrated in an open position in FIG. 3A, and in a closed position in FIG. 3B.

As illustrated in at least FIG. 3A, the door 108 may include a door actuator 302. For example, the door actuator 302 may include, but is not limited to, a hole, a handle, a latch, or other device configured to be acted upon by a user to actuate the door 108. For instance, depending on the type and/or position of the handle or latch 302 on the door 108, the door 108 may fully nest within the cavity 206 in the one or more suite walls 106, or may protrude a select amount from within the cavity 206. It is noted herein the door actuator 302 may include one or more mechanical, electromechanical, pneumatic, or hydraulic actuation devices (e.g., assemblies, controls, actuators such as motors, or the like). In general, it is noted herein any door on the enclosed patient suite 104 may include a door actuator 302 as described above. Therefore, the above description should not be interpreted as a limitation on the scope of the disclosure but merely an illustration.

The suite 104 may include one or more surfaces 304 at the top of the one or more suite walls 106. For example, the one or more surfaces 304 may be used as temporary surfaces (or long-term, depending on whether securing components restraints are installed on the one or more surfaces 304) for access while attending a patient in the patient bed 120.

It is noted herein the door 210 is illustrated in a closed position in FIG. 3A, and in an open position in FIG. 3B. As illustrated in at least FIG. 3B, the one or more storage compartments 208 may include one or more shelves 306 fixed in a defined cavity within the one or more storage compartments 208. For example, the one or more shelves may be accessible when the door 210 is not in the closed position.

The patient bed 120 may be rotatable about an axis cross-wise through the patient bed 120 into a position including, but not limited to, an upright or raised position, one or more lounge or reclined positions, and a lie-flat or bed position. For example, the patient bed 120 may transition directly between the upright position and the lie-flat or bed position. By way of another example, it is noted herein the patient bed 120 may transition through one or more reclined positions between the upright position and the lie-flat or bed position. By way of another example, the patient bed 120 may transition into one or more reclined positions in a motion separate from the transition between the upright position and the lie-flat or bed position. Therefore, the above description should not be interpreted as a limitation on the scope of the disclosure but merely an illustration.

Figure 3C:
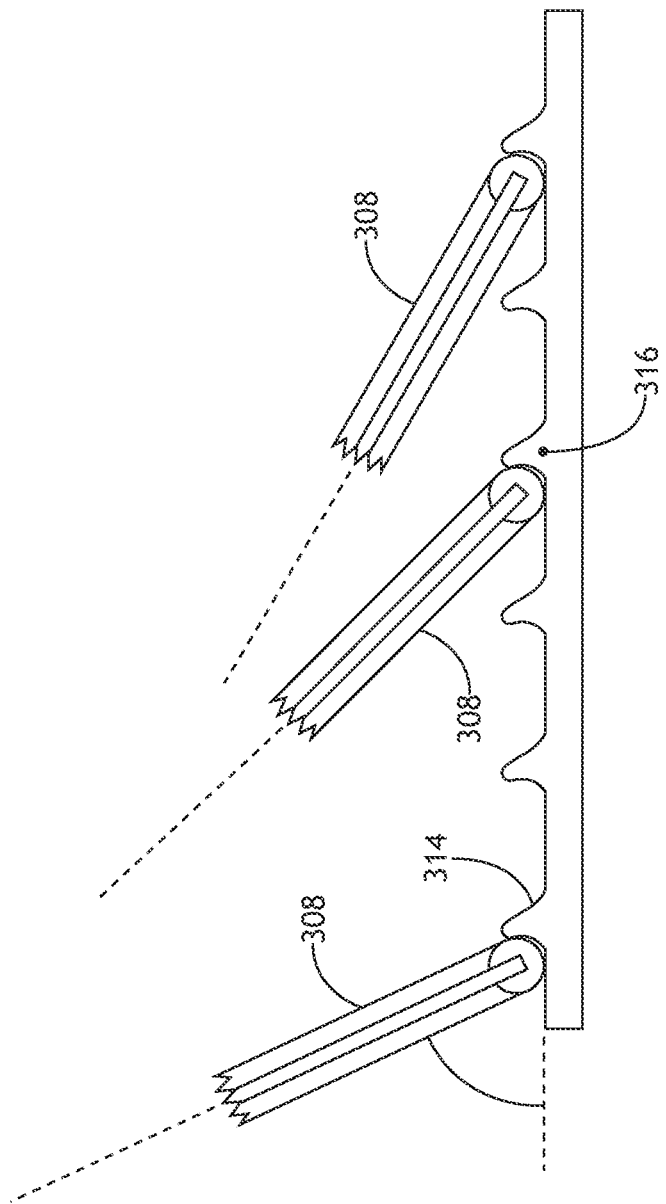
FIG. 3C illustrates a partial elevation view of an enclosed patient suite with mounted medical systems, in accordance with one or more embodiments of the disclosure.

It is noted herein the patient bed 120 is illustrated in a lie-flat or bed position in FIG. 3A, and in a raised position in FIG. 3B. The patient bed 120 may be positioned in the lie-flat or bed position and in a raised position at a particular time by an arm 308. For example, the arm 308 may support an upper portion 310 of the patient bed 120 at an angle 312. For example, the angle may range from 0° to 60°. For instance, as illustrated in FIG. 3C, the angle may be selected by engaging a notch 314 of a set of notches 314 with the arm 308, where the set of notches 314 is in a floor portion 316 of the patient area 200. It is noted herein the positioning of the upper portion 310 may be selected via a mechanical, electromechanical, pneumatic, or hydraulic actuation device (e.g., assemblies, controls, actuators such as motors, or the like). For example, the mechanical, electromechanical, pneumatic, or hydraulic actuation device may include, but is not limited to, a rack-and-pinion assembly (e.g., manually driven or driven with an electric motor and a controller or switch), where the arm 308 is coupled to the rack-and-pinion assembly, in place of the set of notches 314.

As illustrated in at least FIGS. 3D-3G, the suite 104 may include one or more support members 318. The one or more support members 318 may include one or more legs or primary members, to which at least some of the one or more wheels 110 may couple. For example, the suite 104 may include 4, 6, 8, 10, 12 or other number of support members 318, and a corresponding number of wheels 110.

The one or more primary members may be configured to fold under the suite 104 when not in use. For example, the one or more wheels 110 may be configured to fold underneath the suite 104, with the folding of the one or more primary members. The one or more primary members 318 may be telescopic, and may be configured to collapse when not in use. For example, the one or more wheels 110 may be configured to collapse underneath the suite 104, with the collapsing of the one or more primary members 318. It is noted herein the one or more support members 318 may include auxiliary cross-members configured to provide support to the one or more primary members.

In general, the one or more support members 318 may actuate (e.g., fold or collapse) between a raised position and a lowered position. For example, a distance between the raised position and the lowered position may range from 0 inches to 24 inches. The actuation may be caused by one or more mechanical, electromechanical, pneumatic, or hydraulic actuation devices (e.g., assemblies, controls, actuators such as motors, or the like).

It is noted herein the suite 104 may include indicators (e.g., visual, auditory, graphical, or the like) to indicate when the one or more support members 318 are actuating and/or when the one or more floor couplers 112 are engaged or disengaged from the floor 116. For example, the one or more indicators may include, but are not limited to, one or more lights either coupled to or at least partially installed (e.g., inset, embedded, or the like) within the one or more suite walls 106, a housing of the one or more floor couplers 112, or elsewhere on the suite 104.

The suite 104 may include one or more shelves 320 underneath the one or more suite walls 106. The one or more shelves 320 may be coupled to the one or more support members 318. The one or more shelves 320 may be configured to receive and contain (e.g., house, be coupled to, or the like) one or more cables, medical supplies, medical tools, and/or medical devices. For example, one or more of the medical tools and/or medical devices for stabilizing, analyzing, treating, and/or monitoring the patient may be either coupled to or at least partially installed in (e.g., inset, embedded, or the like) a space underneath the one or more suite walls 106 (e.g., on the one or more shelves 320, in one or more cavities defined within the one or more shelves 320, or the like). It is noted herein the coupling or at least partially installing (e.g., insetting, embedding, or the like) medical tools and/or medical devices in the space underneath the one or more suite walls 106 may be considered mounting the medical tools and/or medical devices within the suite 104, for purposes of the disclosure.

The one or more shelves 320 may be stowable underneath the one or more suite walls 106 prior to movement of the suite 104, to secure any cables, medical supplies, medical tools, and/or medical devices on the one or more shelves 320 against the underside of the one or more suite walls 106. The suite 104 may include one or more couplers or brackets 322 configured to hold the one or more shelves in a stowed position.

It is noted herein one or more wheels 110 may be coupled to the underside of the one or more suite walls 106 directly as a fixed-position wheel 110, as opposed to being coupled via the one or more support members 318. For example, the fixed-position wheels 110 may be leading or edge wheels 110. In addition, it is noted herein one or more wheels 110 may be coupled to the underside of the one or more suite walls 106 via a fixed-length support member 318, as opposed to being coupled via an actuatable support member 318. For example, the wheels 110 on fixed-length support members 318 may be center wheels 110.

Figure 4B:
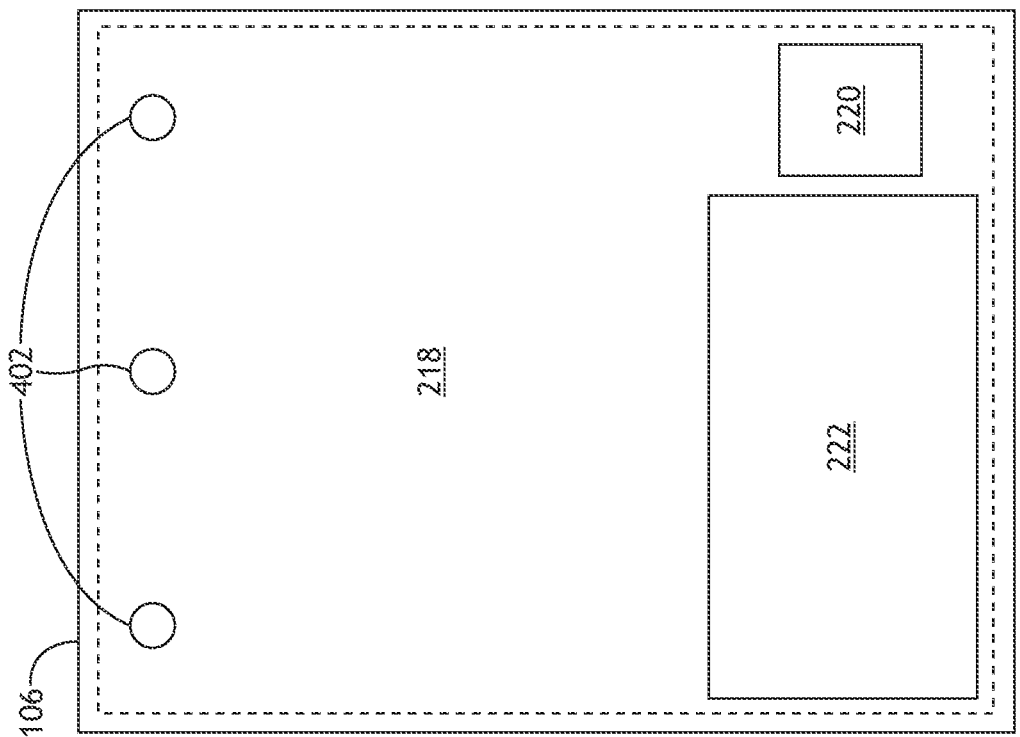
FIG. 4B illustrates an elevation view of an enclosed patient suite with mounted medical systems, in accordance with one or more embodiments of the disclosure.
Figure 4A:
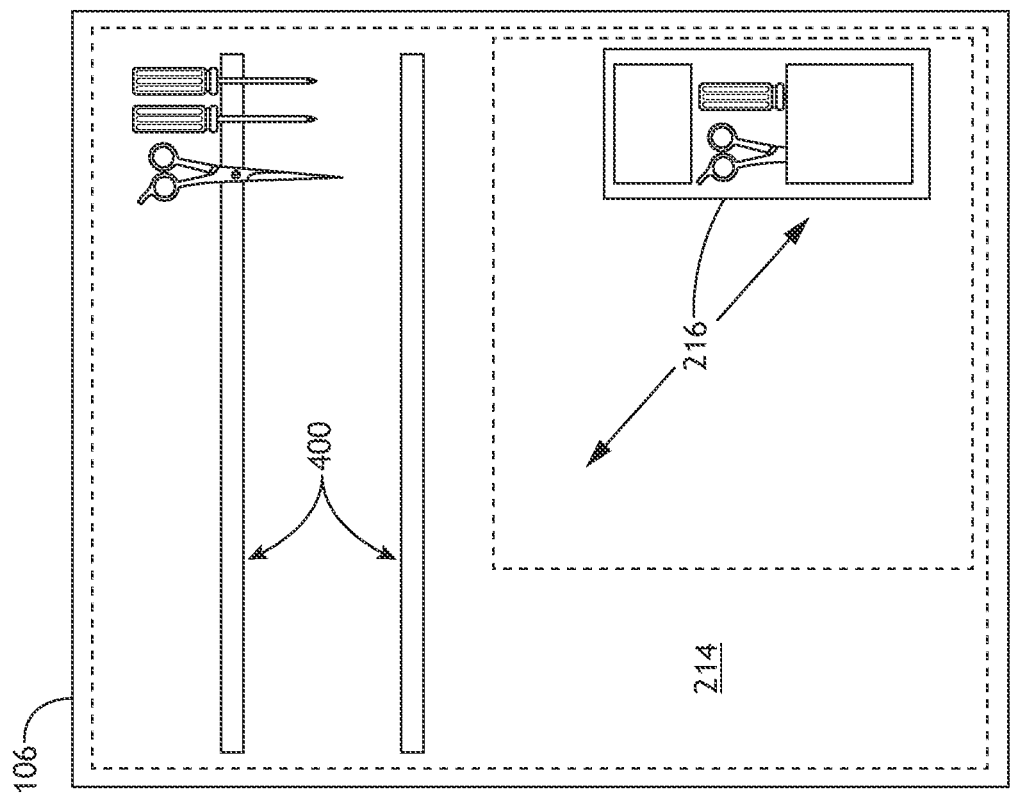
FIG. 4A illustrates an elevation view of an enclosed patient suite with mounted medical systems, in accordance with one or more embodiments of the disclosure.

Referring now to FIGS. 4A and 4B, elevation views of example embodiments of the suite 104 are illustrated, in accordance with one or more embodiments of the disclosure. For example, FIG. 4A illustrates a right elevation view of an interior surface of a first suite wall 106, and FIG. 4B illustrates a right elevation view of an exterior surface of a second suite wall 106 opposite the first suite wall 106.

As illustrated in FIG. 4A, a locking tool rack 400 may be either coupled to or at least partially installed in (e.g., inset, embedded, or the like) the suite wall 106. For example, the locking tool rack 400 may include, but is not limited to, a posi-locking instrument holder, a twist-lock tool holder, a set of mounting bars, a set of magnetic strips, or the like.

It is noted herein the size of the one or more sterilizers 216 may be dependent on the size of the one or more refrigeration units 214, as illustrated in FIG. 4A.

As illustrated in FIG. 4B, the suite wall 106 may include one or more mount locations 402. For example, the one or more mount locations 402 may include, but are not limited to, one or more holes through the suite wall 106 or hooks either coupled to or at least partially installed in (e.g., inset, embedded, or the like) the suite wall 106. For instance, the one or more holes or hooks may be configured to hold medical supplies (e.g., an intravenous solution (IV) bag, a blood transfer pouch, or the like), a coat or other receive long and/or large item needing to be hung, or the like.

The suite 104 may include one or more high-touch areas, or frequent touchpoints in contact with different users, which may have a high potential to transfer microbes (e.g., viruses, pathogens, microorganisms) between the users. In one non-limiting example, the high-touch areas may include portions of the suite walls 106 such as, but not limited to, the interior or exterior surfaces of the suite walls 106, or lead edges of the suite walls 106 proximate to the opening 202 of the suite 104 providing access to the patient area 200 from the cargo hold 102a and/or the cabin 102b. In another non-limiting example, the high-touch areas may include the various components installed within the suite 104 as listed throughout the disclosure.

In general, the one or more high-touch areas may be fabricated from an easy-to-clean material and/or may be protected with coatings. For example, the one or more high-touch areas may be protected with coatings (e.g., antimicrobial, antiviral, antibacterial, or the like) configured to prevent the transfer of microbes. It is noted herein the coatings may be in addition to or instead of disinfection of the high-touch areas during regular cleanings, fogging, and/or cleaning of the suite 104.

It is noted herein the suite 104 may include one or more stowable seats (e.g., flight attendant seats or other stowable seats) coupled to the suite 104.

In general, the stowable seat may be translatable (e.g., trackable or slidable). The stowable seat may be rotatable about an axis cross-wise through the stowable seat into a position including, but not limited to, an upright or raised position, one or more lounge or reclined positions, and a lie-flat or bed position. For example, the stowable seat may transition directly between the upright position and the lie-flat or bed position. By way of another example, it is noted herein the stowable seat may transition through one or more reclined positions between the upright position and the lie-flat or bed position. By way of another example, the stowable seat may transition into one or more reclined positions in a motion separate from the transition between the upright position and the lie-flat or bed position. Therefore, the above description should not be interpreted as a limitation on the scope of the disclosure but merely an illustration.

The stowable seat may be rotatable about an axis (e.g., swivelable). The stowable seat may be fully positionable between the outer limits of motion as defined by one or more components of the suite 104. It is noted herein an upright or raised position may be considered a taxi, takeoff, or landing (TTOL) position during select stages of flight (though the upright or raised position is not limited to use during the select stages of flight as the TTOL position, but also may be used at any point during the flight), for purposes of the present disclosure. In addition, it is noted herein that any position that does not meet the above-defined requirements of the TTOL position may be considered a non-TTOL position, for purposes of the present disclosure. Further, it is noted herein the stowable seat may be actuatable (e.g., translatable and/or rotatable) from the TTOL position to a non-TTOL position, and/or vice versa. Further, it is noted herein the stowable seat may be capable of a fully upright or raised position, and that the TTOL position may have a more reclined seat back cushion and a more angled upward seat pan cushion as compared to the fully upright or raised position. Therefore, the above description should not be interpreted as a limitation on the present disclosure but merely an illustration.

The stowable seat may be configured to avoid contact with the one or more components of the suite 104 when transitioning between positions (e.g., between the upright or raised position and the lie-flat or bed position).

It is noted herein the embodiments of the disclosure related to the placement of medical supplies, medical tools, and/or medical devices within the enclosed patient suite 104 are provided only as example embodiments, and that the medical supplies, medical tools, and/or medical devices may be located anywhere within the enclosed patient suite 104 as allowed by the dimensions of the medical supplies, medical tools, and/or medical devices. Therefore, the above description should not be interpreted as a limitation on the scope of the disclosure but merely an illustration.

In this regard, the enclosed patient suite 104 and the included medical tools, medical devices, and other components installed within the enclosed patient suite 104 may be moveable as a single, self-contained unit between environments. Being a single, self-contained unit may allow for all necessary medical systems for stabilizing, analyzing, treating, and/or monitoring a patient being transported in the enclosed patient suite 104. Although the capability may be included within the enclosed patient suite 104, the enclosed patient suite 104 may be able to operate without connecting to any surrounding systems and/or may be able to move without disconnecting any patient-supporting systems.

FIGS. 5A-8 in general illustrate movement of the enclosed patient suite 104 through environments, in accordance with one or more embodiments throughout the disclosure.

The suite 104 is not limited to the aviation environment (e.g., the aircraft 100) and/or the aircraft components within the aviation environment (e.g., the cargo hold 102a, the cabin 102b, or the like). For example, the suite 104 may be configured for any type of vehicle known in the art. For example, the vehicle may be any air, space, land, or water-based personal equipment or vehicle; any air, space, land, or water-based commercial equipment or vehicle; any air, space, land, or water-based military equipment or vehicle known in the art. For instance, the vehicle may include a truck or an ambulance. By way of another example, the suite 104 may be configured for commercial or industrial use in either a home or a business (e.g., within a hospital).

Figure 5A:
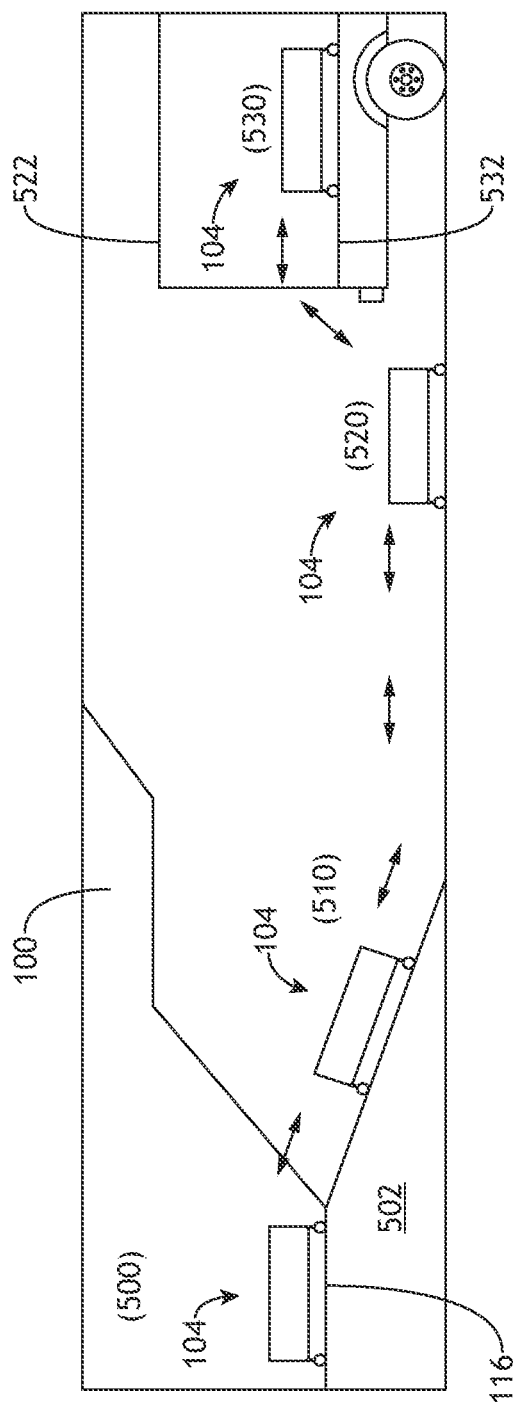
FIG. 5A illustrates an enclosed patient suite, an aircraft, and a vehicle, in accordance with one or more embodiments of the disclosure.

Referring now to FIG. 5A, the suite 104 may be transferred from the aircraft 100. At a time 500, the suite 104 may be in the aircraft 100. It is noted herein the suite 104 may be coupled to the aircraft 100 for at least one of power transfer or data transfer at the time 500. At a time 510, the suite 104 may be unloaded down a ramp 502 of the aircraft 100. At a time 520, the suite 104 may be transported to a vehicle 522 (e.g., an ambulance, a truck, or the like). At a time 530, the suite 104 may be loaded into the vehicle 522. For example, a vehicle 522 may include a floor 532 upon which the suite 104 may be loaded. It is noted herein the suite 104 may be coupled to the vehicle 522 for at least one of power transfer or data transfer at the time 530.

Figure 5B:
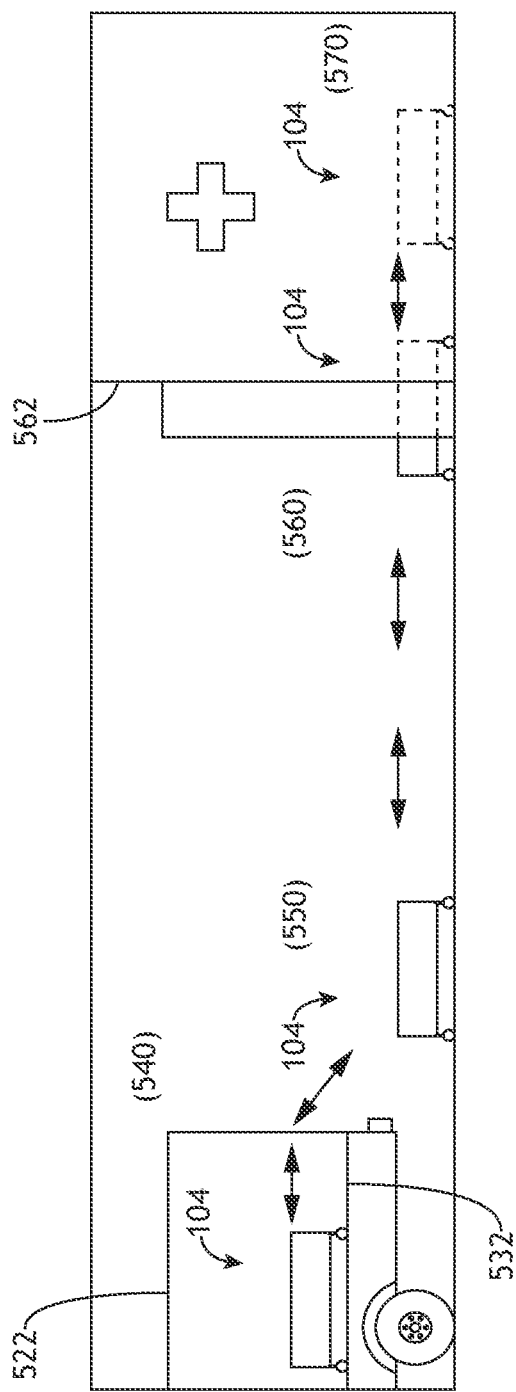
FIG. 5B illustrates an enclosed patient suite, a vehicle, and a building, in accordance with one or more embodiments of the disclosure.

Referring now to FIG. 5B, the suite 104 may be transferred from the vehicle 522. At a time 540, the suite 104 may be in the vehicle 522. It is noted herein the suite 104 may be coupled to the vehicle 522 for at least one of power transfer or data transfer at the time 540. At the time 550, the suite 104 may be unloaded from the vehicle 522. At a time 560, the suite 104 may be transported to a building 562 (e.g., a hospital, or the like). At a time 570, the suite 104 may be positioned at a designated location within the building 562. It is noted herein the suite 104 may be coupled to the building 562 for at least one of power transfer or data transfer at the time 570.

Figure 6:
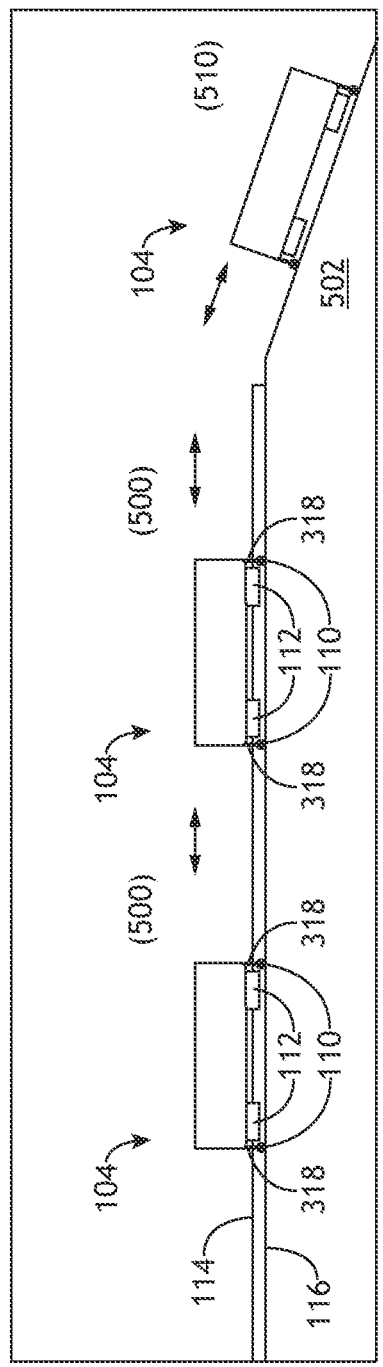
FIG. 6 illustrates an enclosed patient suite and an aircraft, in accordance with one or more embodiments of the disclosure.
Figure 7A:
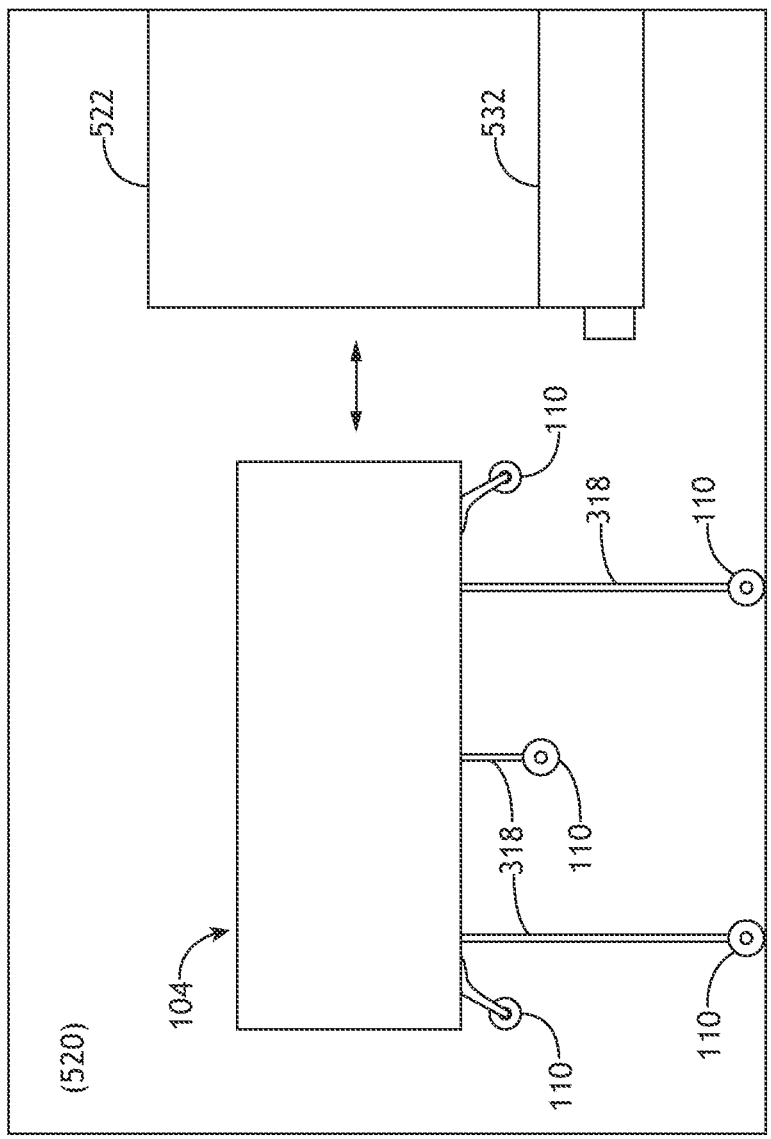
FIG. 7A illustrates an enclosed patient suite and a vehicle, in accordance with one or more embodiments of the disclosure.
Figure 7B:
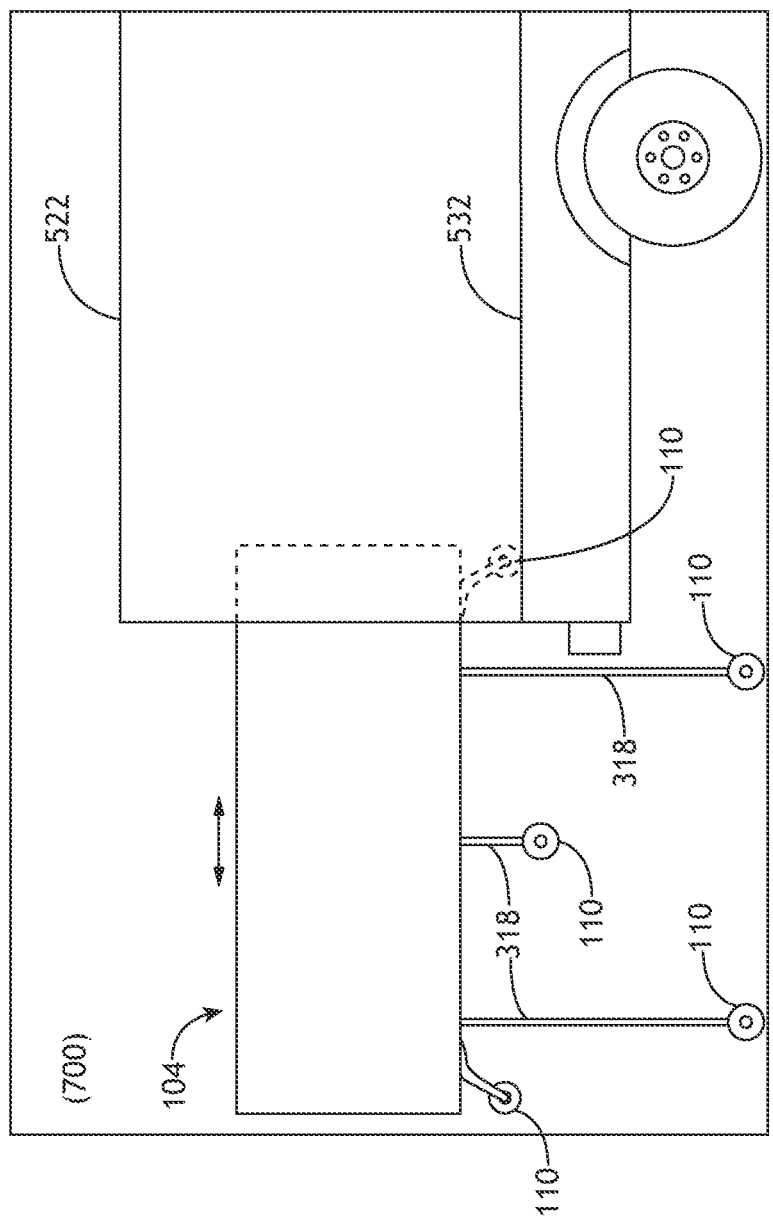
FIG. 7B illustrates an enclosed patient suite and a vehicle, in accordance with one or more embodiments of the disclosure.
Figure 7C:
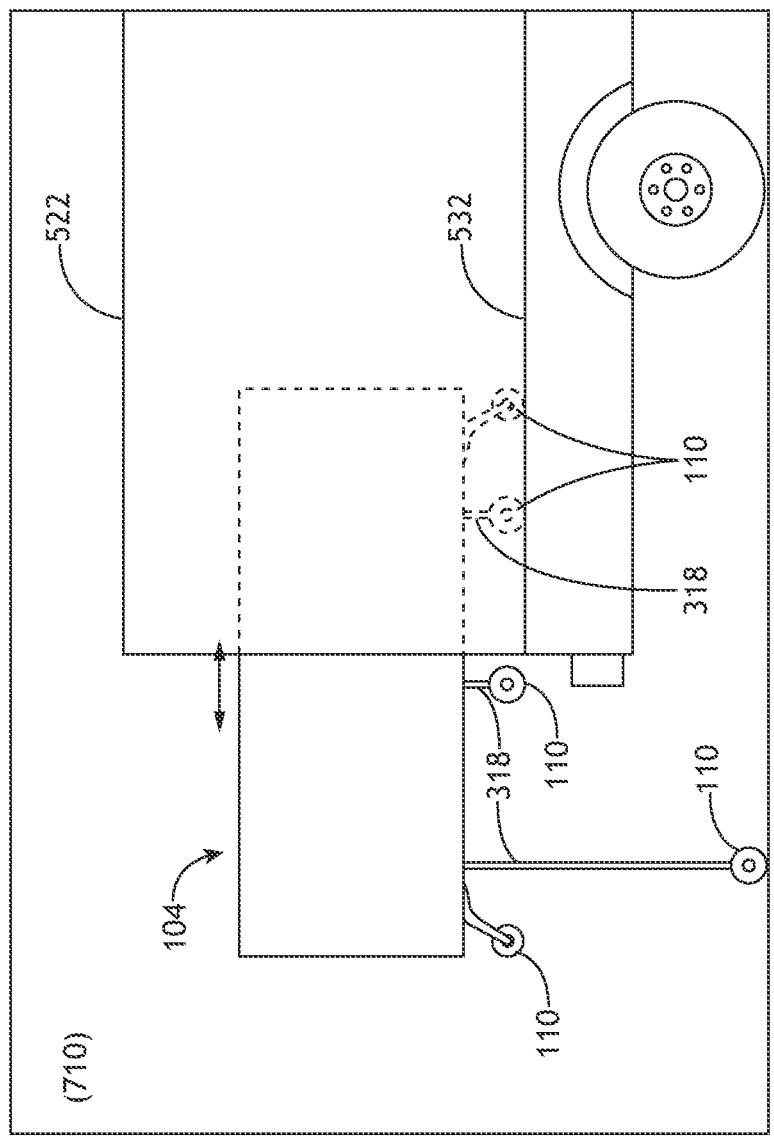
FIG. 7C illustrates an enclosed patient suite and a vehicle, in accordance with one or more embodiments of the disclosure.
Figure 7D:
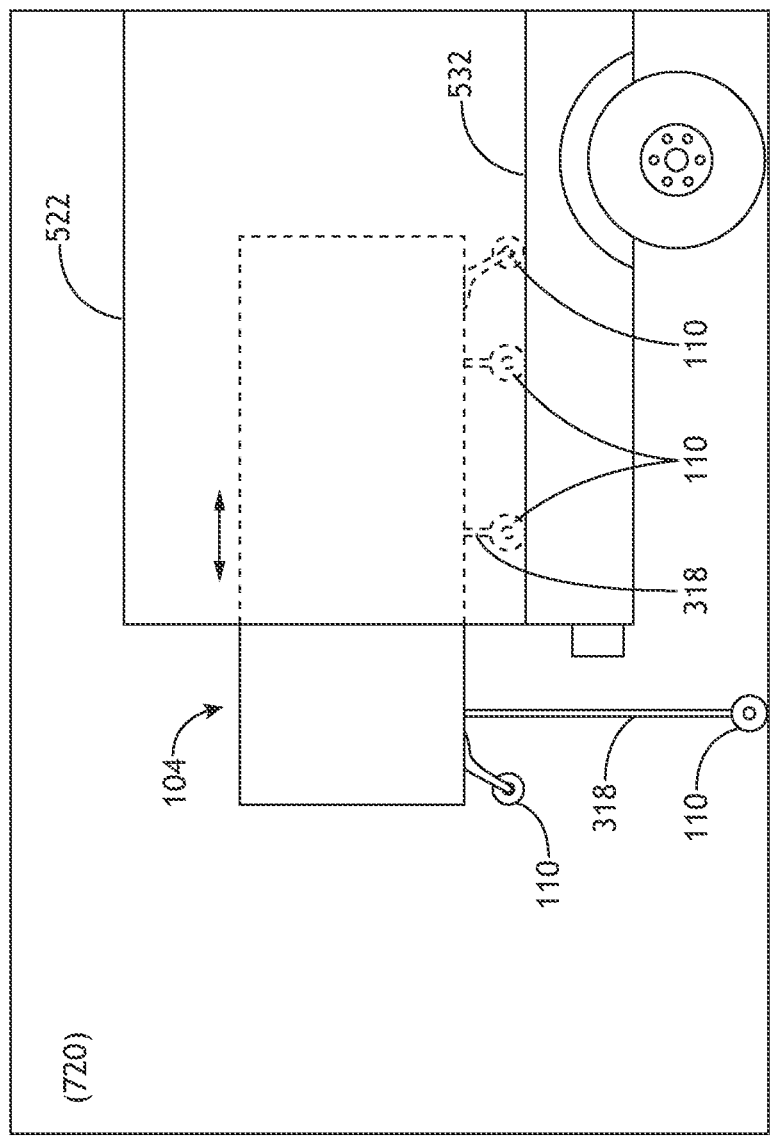
FIG. 7D illustrates an enclosed patient suite and a vehicle, in accordance with one or more embodiments of the disclosure.

Referring now to FIG. 6, details of the motion of the suite 104 between times 500 and 510 are illustrated. At the time 500, the suite 104 may be coupled to a floor-mounted component 114 in the floor 116 of the aircraft 100 with the one or more couplers 112 (e.g., rail brake, feet, or the like) At the time 510, the suite 104 may be uncoupled from the floor-mounted component 114 and be transported down the ramp 502. For example, the one or more couplers 112 may slide off the rail after the suite 104 is uncoupled while being moved to exit the aircraft 100. Although only one suite 104 is illustrated as being coupled to the floor-mounted component 114 at the time 500, it is noted herein multiple suites 104 may be installed on a single floor-mounted component 114.

Referring now to FIG. 7A-7E, details of the motion of the suite 104 between times 520 and 530 are illustrated. At a time 700, an outside fixed position wheel 110 may come into contact with the floor 532 of the vehicle 522, and an adjacent support member 318 with wheel 110 may be actuated to raise the wheel 110 from a ground height to a floor 532 height. At a time 710, the raised wheel 110 coupled to the actuatable support member 318 may come into contact with the floor 532 of the vehicle 522, allowing the suite 104 to further move into the vehicle 522. At a time 720, a fixed-length support member 318 with wheel 110 may come into contact with the floor 532 of the vehicle 522 and the suite 104 may further move into the vehicle 522, effectively shifting the bulk of the weight onto the floor 532 of the vehicle 522 (as opposed to the ground outside the vehicle 522), and a second support member 422 with wheel 110 may be actuated to raise the wheel 110 from the ground height to the floor 532 height.

It is noted herein the fixed position wheel 110 and/or the fixed-length support member 318 with wheel 110 may be replaced with an actuatable support member 318 with wheel 110.

Figure 8:
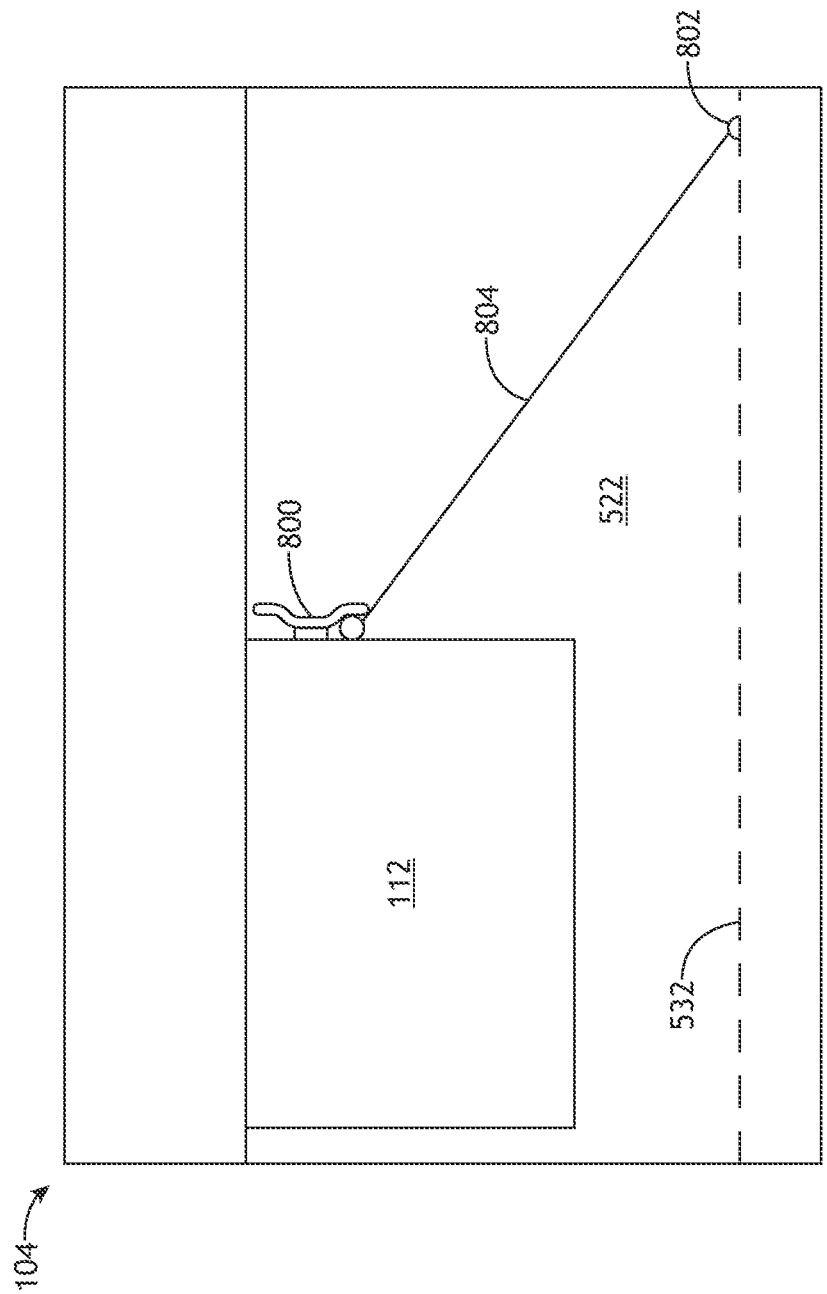
FIG. 8 illustrates portions of an enclosed patient suite and a vehicle, in accordance with one or more embodiments of the disclosure.

Referring now to FIG. 8, the suite 104 may include a coupling assembly configured to hold the suite 104 in the vehicle 522. For example, the coupling assembly may include an attach point 800 (e.g., hook or eye ring, component of an interlocking assembly, or the like) on the suite 104 (e.g., on the housing of a coupler 112) and an attach point 802 (e.g., hook or eye ring, component of an interlocking assembly, or the like) in the floor 532 of the vehicle 522, where the attach point 800 and the attach point 802 may be coupled. For example, a rope or strap 804 may pass through the attach point 800 and the attach point 802. By way of another example, a bar or linkage 804 may couple to the attach point 800 and the attach point 802.

It is noted herein the steps illustrated in FIGS. 5A-8 may be reversed (or at least performed in a different order) to remove the suite 104 from the building 562, to remove the suite 104 from the vehicle 522, and/or load the suite 104 onto the aircraft 100. In addition, it is noted herein the movement of the suite 104 between the aircraft 100 and the vehicle 522 and/or the movement of the suite 104 between the vehicle 522 and the building 562 may include more or fewer steps. Therefore, the above description should not be interpreted as a limitation on the scope of the disclosure but merely an illustration.

Although not shown, it should be understood the suite 104 may move directly between the aircraft 100 and the building 562. Therefore, the above description should not be interpreted as a limitation on the scope of the disclosure but merely an illustration.

It is noted herein the one or more support members 318 being in the raised position may actuate the corresponding wheels 110 closer to the underside of the one or more suite walls 106, decreasing a distance between an underside of the one or more suite walls 106 and a floor of the aircraft 100 (e.g., the floor 116), the vehicle 522 (e.g., the floor 532), or the building 562. In addition, it is noted herein the one or more support members 318 being in the lowered position may actuate the corresponding wheels 110 farther from the underside of the one or more suite walls 106, increasing a distance between an underside of the one or more suite walls 106 and a floor of an aircraft, vehicle, or building.

It is noted herein the embodiments of the disclosure related to the dimensions of the enclosed patient suite 104 and/or of components installed within the enclosed patient suite 104 are provided only as example embodiments. In general, the enclosed gurney suite may be dimensioned based on a standardized layout for insertion, removal, and transport within any of a number of aircraft cargo holds 102a or aircraft cabins 102b of the aircraft 100, the vehicle 522, and/or the building 562. For example, the suite 104 may be dimensioned to fit within standard building doors, standard ambulance doors, standard aircraft doors or loading ramps, or the like. Therefore, the above description should not be interpreted as a limitation on the scope of the disclosure but merely an illustration.

Figure 9:
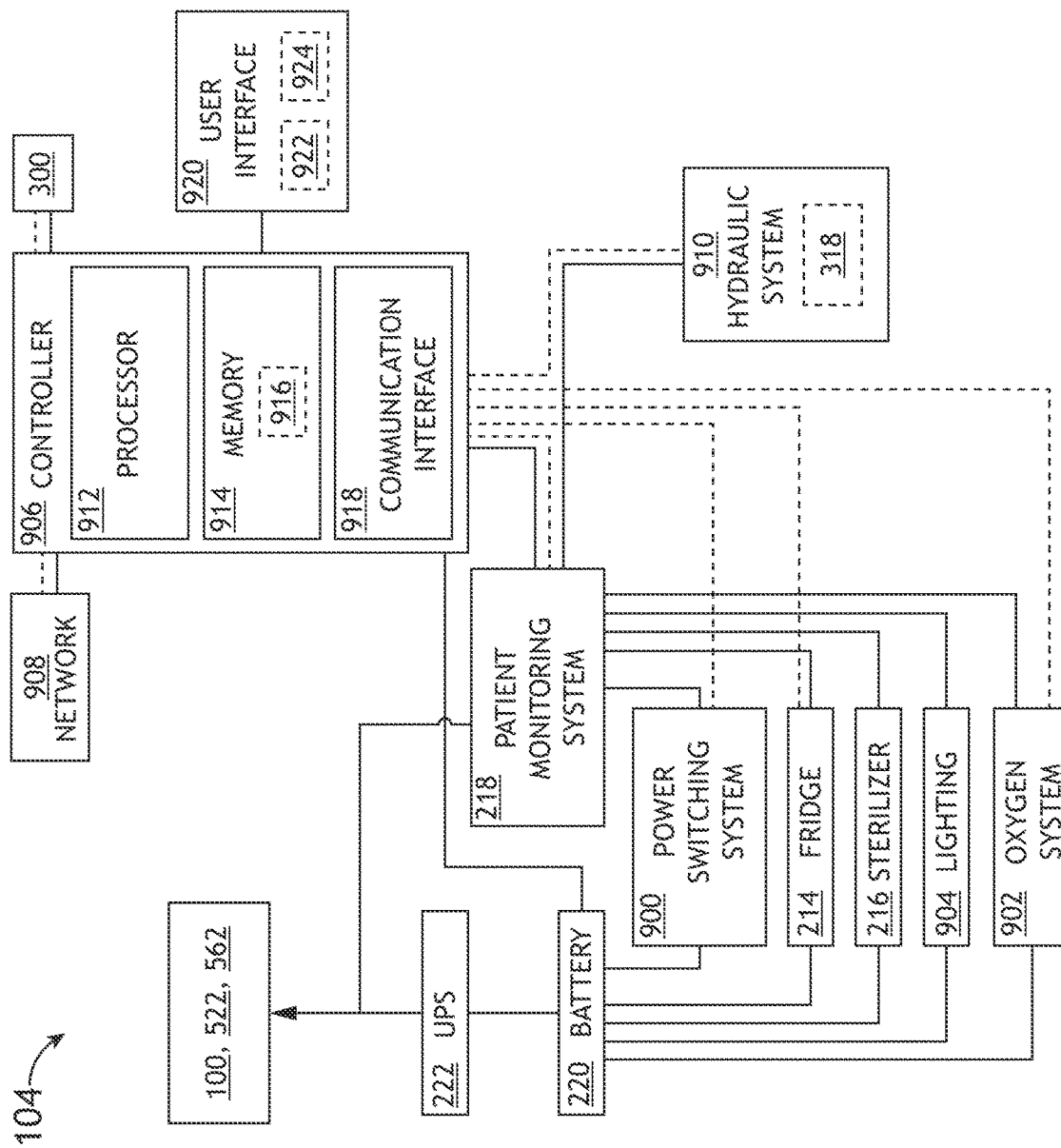
FIG. 9 illustrates a simplified schematic of an enclosed patient suite, in accordance with one or more embodiments of the disclosure.

FIG. 9 illustrates a simplified schematic or block diagram of the enclosed patient suite 104, in accordance with one or more embodiments of the disclosure. It is noted herein the solid connection lines may represent power transfer and the broken connection lines may represent data transfer in FIG. 9.

The UPS 222 may be coupled to the battery 220. The UPS 222 may be coupled to one or more of the aircraft 100, a vehicle 522, or a building 562 via connections for couplers (e.g., physical couplers, electrical couplers, fluidic couplers, communicative couplers, or the like) configured to attach to a surrounding power system for purposes of obtaining power and/or data. For example, the coupler may include a 120V wall plug.

The suite 104 may include a power switching system 900. The power switching system 900 may determine which power source powers the medical systems in the suite 104 at a given time. For instance, the power switching system 900 may allow the external surrounding power system to charge the battery 220 and/or the UPS 222 when the suite 104 is coupled to the aircraft 100, the vehicle 522 or the building 562. In addition, the power switching system 900 may allow the external surrounding power system to power medical systems of the suite 104 when the suite 104 is coupled to the aircraft 100, the vehicle 522 or the building 562. Further, the power switching system 900 may switch the battery 220 to power medical systems of the suite 104 when the suite 104 is uncoupled from the aircraft 100, the vehicle 522 or the building 562. Further, the power switching system 900 may switch the UPS 222 to power medical systems of the suite 104 when the battery 220 fails or is depleted.

The battery 220, the power switching system 900, and the external surrounding power system may each be coupled to the one or more refrigeration units 214, the one or more sterilizers 216, the patient monitoring system 218, an oxygen system 902, lighting 904 within the suite 104, and/or a controller 906, depending on the power switching system 900. For example, the lighting 904 may be either coupled to or at least partially installed in (e.g., inset, embedded, or the like) the one or more suite walls 106.

The controller 906 may be coupled to a network 908, one or more hydraulic systems 910 including the one or more support members 318 (e.g., along with the power switching system 900), and/or the ID tags 300.

The controller 906 may include one or more processors 912. The controller 906 may include memory 914, and the one or more processors 912 may be configured to execute a set of program instructions 916 stored in memory 914, the set of program instructions 916 being configured to cause the one or more processors 912 to carry out various steps and processes of the present disclosure.

The controller 906 may include one or more communication interfaces 918 configured to couple to at least the network 908. For example, the network 908 may include components configured to connect via a wireline (e.g., copper wire, fiber optic cable, and the like) or wireless connection (e.g., RF coupling, IR coupling, data network communication (e.g., WiFi, WiMax, 3G, 4G, 4G LTE, 5G, Bluetooth, and the like) for remote medical input including the transmitting and receiving of medical data and/or medical instructions.

The one or more processors 912 may include any one or more processing elements known in the art. In this sense, the one or more processors 912 may include any microprocessor-type device configured to execute software algorithms and/or instructions. The one or more processors 912 may consist of a desktop computer, mainframe computer system, workstation, image computer, parallel processor, or other computer system (e.g., networked computer) configured to execute a program configured to operate the suite 104, as described throughout the present disclosure. It should be recognized that the steps described throughout the present disclosure may be carried out by a single computer system or, alternatively, multiple computer systems. Furthermore, it should be recognized that the steps described throughout the present disclosure may be carried out on any one or more of the one or more processors 912. In general, the term "processor" may be broadly defined to encompass any device having one or more processing elements, which execute program instructions from memory 914. Moreover, different subsystems of the suite 104 (e.g., the patient monitoring system 218) may include processor or logic elements suitable for carrying out at least a portion of the steps described throughout the present disclosure. Therefore, the above description should not be interpreted as a limitation on the present disclosure but merely an illustration.

The memory 914 may include any storage medium known in the art suitable for storing program instructions executable by the associated one or more processors 912 and the data received/generated by the suite 104. For example, the memory 914 may include a non-transitory memory medium. For instance, the memory 914 may include, but is not limited to, a read-only memory (ROM), a random-access memory (RAM), a magnetic or optical memory device (e.g., disk), a magnetic tape, a solid-state drive and the like. It is further noted that memory 914 may be housed in a common controller housing with the one or more processors 912. The memory 914 may be located remotely with respect to the physical location of the processors 912 and controller 906. The memory 914 may maintain program instructions for causing the one or more processors 912 to carry out the various steps described through the present disclosure.

The suite 104 may include a user interface 920 communicatively coupled to the controller 906. The user interface 920 may include, but is not limited to, one or more desktops, tablets, smartphones, smart watches, or the like. The user interface 920 may include one or more displays 922 used to display data of the suite 104 to a user. The user interface 920 may include one or more user input devices 924 used to interact with the one or more displays 922 and/or components coupled to the user interface 920 either directly or indirectly (e.g., via the controller 906).

The one or more displays 922 of the user interface 920 may include any display known in the art. For example, the display may include, but is not limited to, a liquid crystal display (LCD), an organic light-emitting diode (OLED) based display, or a CRT display. Those skilled in the art should recognize that any display device capable of integration with a user interface 920 is suitable for implementation in the present disclosure. In another embodiment, a user may input selections and/or instructions responsive to data displayed to the user via the one or more user input devices 924 of the user interface 920. The one or more user input devices 924 may include one or more toggles, switches, knobs, or other user input devices.

Figure 10:
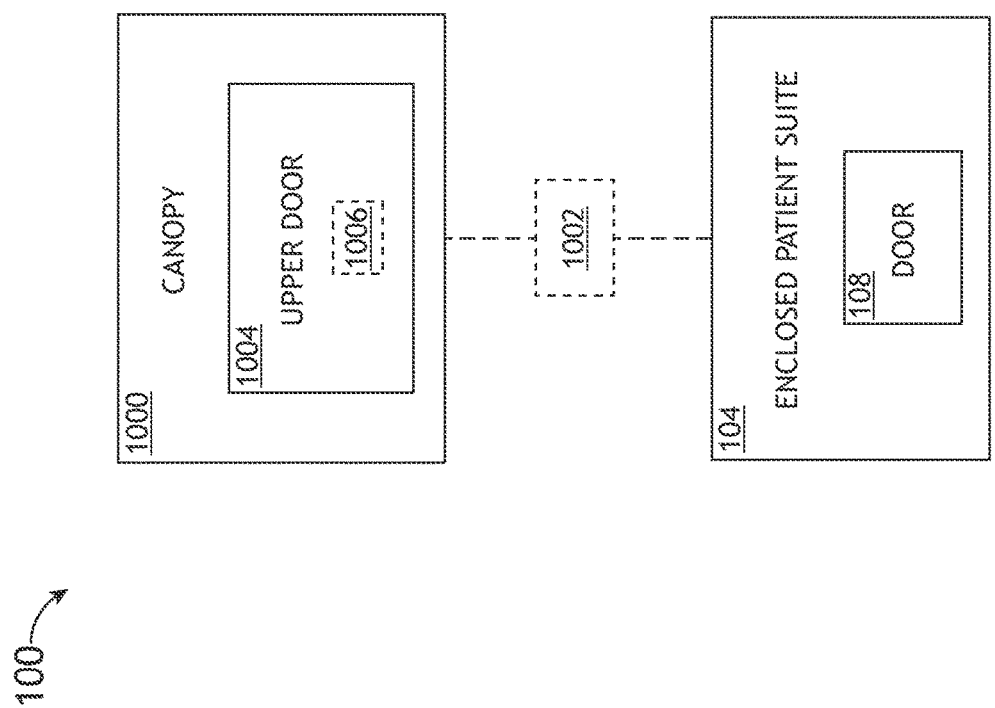
FIG. 10 illustrates a simplified block diagram of an enclosed patient suite with a canopy, in accordance with one or more embodiments of the disclosure.

FIG. 10 illustrates a simplified block diagram of the enclosed patient suite 104, in accordance with one or more embodiments of the disclosure.

The suite 104 may include a canopy 1000. For example, the canopy 1000 may be fabricated from a rigid material (e.g., metal, plastic, or the like) and configured to retain its shape and/or size. By way of another example, the canopy 1000 may be fabricated from a non-rigid material (e.g., fabric, mesh, netting, or the like) and configured to be drawable, foldable, collapsible, or the like.

The canopy 1000 may be integrated with the one or more suite walls 106, or may be attachable to the one or more suite walls 106 and/or the one or more doors 108. For example, the canopy 1000 may be attachable via interlocking assemblies configured to allow for a quick release of the canopy 1000 from the one or more suite walls 106 (e.g., tab and groove assemblies, latch assemblies, snap-fit or interference assemblies, or the like), and/or fasteners (e.g., fasteners such as washers, threaded nuts, bushings, spacers, or the like). By way of another example, the canopy 1000 may be removed and stored in the aircraft 100 when not required to enclose the patient for privacy and/or for safety (e.g., safety in instances where exposure to an outside environment may threaten the patient and/or medical personnel treating the patient). It is noted herein a gap between the canopy 1000 and the one or more suite walls 106 may be filled in with a filler component fabricated from a solid soft material (e.g., a foam block or shield, a rubber block or shield, or the like), a solid hard material (e.g., a plastic block or shield, a metal block or shield, or the like), a fluidic hardening material (e.g., caulk or other sealing compound), or the like.

The suite 104 may include a dome canopy 1000, a flat canopy 1000 (e.g., a ceiling), or a pitched canopy 1000 (e.g., a canopy 1000 that comes to a point at its height). It is noted herein, however, the suite 104 may include extra-high walls 106, such that the canopy 1000 does not form part of the sides of the suite 104.

The suite 104 may include one or more mount points 1002 for the canopy 1000. For example, components of one or more interlocking assemblies (e.g., tab and groove assemblies, latch assemblies, snap-fit or interference assemblies, or the like) may be attached to the suite 104 at the one or more mount points 1002, to which corresponding components of the one or more interlocking assemblies attached to the canopy 1000 may couple.

The suite 104 may include an upper door 1004. For example, the upper door 1004 may be a portion of the canopy 1000 coupled to the door 108 when the canopy 1000 is coupled to the one or more suite walls 106. By way of another example, the upper door 1004 may be integrated with the door 108. For instance, the upper door 1004 may be stowable against a surface (e.g., exterior surface or interior surface) of the door 108, or may be stowable in a cavity defined within the door 108, when the canopy 1000 is not attached to or integrated with the one or more suite walls 106. The upper door 1004 may be configured to actuate independently of the door 108 and/or may be configured to actuate with an actuation of the door 108.

A portion 1006 of the upper door 1004 may be open to allow for viewing into the patient area 200, although the door 108 may be in the closed position. For example, the portion 1006 may be a cut-out within the upper door 1004. By way of another example, the portion 1006 may be closeable (e.g., with a door, screen, curtain, or the like) for privacy and/or for safety (e.g., safety in instances where exposure to an outside environment may threaten the patient and/or medical personnel treating the patient).

It is noted herein the lighting 904, as described throughout the disclosure, may be either coupled to or at least partially installed in (e.g., inset, embedded, or the like) the canopy 1000. In addition, it is noted herein portions of the canopy 1000 (e.g., exterior or interior surfaces) may include one or more high-touch areas, where the high-touch areas are fabricated from an easy-to-clean material and/or may be protected with coatings, as described throughout the disclosure.

In this regard, the enclosed patient suite 104 with mounted medical systems may be insertable, removable, moveable, and/or transportable in an aircraft 100, a vehicle 522 (e.g., an ambulance, or the like), and/or a building 562 (e.g., a hospital, or the like). The enclosed patient suite 104 may include the patient bed 120. The enclosed patient suite 104 may include mounted medical tools and/or medical devices 214, 216, 218, 220, 222, 300, 400 for stabilizing, analyzing, treating, and/or monitoring the patient, which accompany the patient bed 120 within the enclosed patient suite 104. The enclosed patient suite 104 may include connections for couplers (e.g., physical couplers, electrical couplers, fluidic couplers, communicative couplers, or the like) configured to attach to the aircraft 100, the vehicle 522, and/or the building 562 with the medical tools and/or medical devices 214, 216, 218, 220, 222, 300, 400 for stabilizing, analyzing, treating, and/or monitoring the patient accompanying the patient bed 120 within the enclosed patient suite 104. The patient bed 120 may be enclosed for privacy and/or for safety (e.g., safety in instances where exposure to an outside environment may threaten the patient and/or medical personnel treating the patient).

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed:

1. An enclosed patient suite, comprising:
   a patient bed;
   a plurality of suite walls, the patient bed being positioned in a patient area defined within the plurality of suite walls;
   a plurality of medical systems, at least some of the plurality of medical systems being mounted to the plurality of suite walls;
   a plurality of support members, the plurality of support members being coupled to the plurality of suite walls;
   a plurality of wheels, a particular wheel of the plurality of wheels being coupled to a corresponding support member of the plurality of support members;
   a rail brake, the rail brake being configured to engage a floor-mounted rail in a floor of at least one of a cargo hold or a cabin of an aircraft, the enclosed patient suite being dimensioned to fit within the aircraft; and
   a controller, the controller being coupled to the plurality of medical systems, the controller configured to receive data from and transmit data to the plurality of medical systems.

2. The enclosed patient suite of claim 1, an upper portion of the patient bed being actuatable between a bed position and at least one raised position.

3. The enclosed patient suite of claim 1, at least some of the plurality of wheels being coupled to the plurality of suite walls.

4. The enclosed patient suite of claim 1, at least some of the plurality of support members being actuatable between a raised position and a lowered position.

5. The enclosed patient suite of claim 1, at least some of the plurality of support members being a fixed length.

6. The enclosed patient suite of claim 1, the plurality of medical systems including at least one of a refrigeration unit, a sterilizer, a patient monitoring system, a locking tool rack, a plurality of mount locations for medical supplies, or one or more identification tags.

7. The enclosed patient suite of claim 1, further comprising:
   a door, the door being configured to actuate between an open position and a closed position, the door being configured to provide access to the patient area through an opening in the plurality of suite walls.

8. The enclosed patient suite of claim 7, the closed position of the door being located in a cavity defined within the plurality of suite walls.

9. The enclosed patient suite of claim 1, the enclosed patient suite being configured to couple to the aircraft for at least one of power transfer or data transfer.

10. The enclosed patient suite of claim 9, further comprising:
    a battery;
    an uninterruptable power supply (UPS); and
    a power switching system coupled to at least one of the battery, the UPS, or the aircraft.

11. The enclosed patient suite of claim 10, the power switching system being configured to allow the aircraft to charge at least one of the battery or the UPS when the enclosed patient suite is coupled to the aircraft.

12. The enclosed patient suite of claim 10, the power switching system being configured to allow the aircraft to power at least some of the plurality of medical systems when the enclosed patient suite is coupled to the aircraft.

13. The enclosed patient suite of claim 10, the power switching system being configured to switch the battery or the UPS to powering at least some of the plurality of medical systems when the enclosed patient suite is uncoupled from the aircraft.

14. An enclosed patient suite, comprising:
    a patient bed;
    a plurality of suite walls, the patient bed being positioned in a patient area defined within the plurality of suite walls;
    a plurality of medical systems, at least some of the plurality of medical systems being mounted to the plurality of suite walls;
    a plurality of support members, the plurality of support members being coupled to the plurality of suite walls;
    a plurality of wheels, a particular wheel of the plurality of wheels being coupled to a corresponding support member of the plurality of support members;
    a rail brake, the rail brake being configured to engage a floor-mounted rail in a floor of at least one of a cargo hold or a cabin of an aircraft, the enclosed patient suite being dimensioned to fit within the aircraft, a vehicle, and a building, the enclosed patient suite being transferrable between the aircraft and the vehicle at a first time, the enclosed patient suite being transferrable between the aircraft and the building at a second time; and
    a controller, the controller being coupled to the plurality of medical systems, the controller configured to receive data from and transmit data to the plurality of medical systems.

15. The enclosed patient suite of claim 14, the enclosed patient suite being configured to couple to the aircraft at a third time for at least one of power transfer or data transfer, the enclosed patient suite being configured to couple to the vehicle at a fourth time for at least one of power transfer or data transfer, the enclosed patient suite being configured to couple to the building at a fifth time for at least one of power transfer or data transfer.

* * * * *